(12) United States Patent
Padan

(10) Patent No.: US 7,793,888 B2
(45) Date of Patent: Sep. 14, 2010

(54) APPARATUS AND METHOD FOR AIR-TO-AIR ARMING OF AERIAL VEHICLES

(76) Inventor: Nir Padan, P.O. Box 36, Moshav Beith Yitzhak (IL) 42920

( * ) Notice: Subject to any disclaimer, the term of this patent is extended or adjusted under 35 U.S.C. 154(b) by 456 days.

(21) Appl. No.: 10/568,242

(22) PCT Filed: Feb. 18, 2004

(86) PCT No.: PCT/IL2004/000152

§ 371 (c)(1),
(2), (4) Date: Feb. 14, 2006

(87) PCT Pub. No.: WO2005/016749

PCT Pub. Date: Feb. 24, 2005

(65) Prior Publication Data

US 2006/0202088 A1 Sep. 14, 2006

(30) Foreign Application Priority Data

Aug. 14, 2003 (IL) .................................... 157401

(51) Int. Cl.
*B64D 1/12* (2006.01)
(52) U.S. Cl. .............. 244/137.4; 244/118.1; 244/137.1; 89/1.54
(58) Field of Classification Search .............. 244/118.1, 244/137.1, 137.4, 173.3, 173.1, 1 R, 118.2, 244/137.2, 136, 135 A; 414/812, 334, 340, 414/346; 89/40.07, 1.54, 1.51
See application file for complete search history.

(56) References Cited

U.S. PATENT DOCUMENTS

| | | | |
|---|---|---|---|
| 2,692,121 A | | 10/1954 | Brown |
| 3,008,674 A | * | 11/1961 | Abraham ................. 244/135 A |
| 3,167,278 A | * | 1/1965 | Roberge ................... 244/137.4 |
| 3,768,415 A | * | 10/1973 | Czajkowski et al. ......... 102/225 |
| 4,917,329 A | | 4/1990 | Vollmerhausen |
| 5,103,712 A | * | 4/1992 | Minovitch ................... 89/1.11 |
| 5,243,896 A | * | 9/1993 | Rodriguez ................. 89/40.07 |
| 6,079,664 A | | 6/2000 | Salzberger |
| 6,523,783 B2 | | 2/2003 | Lounge et al. |

(Continued)

FOREIGN PATENT DOCUMENTS

EP 0786403 7/1997

(Continued)

OTHER PUBLICATIONS

Translation of JP01254494A, Feb. 2009, PTO 09-2951.*

(Continued)

*Primary Examiner*—Christopher P Ellis

(57) ABSTRACT

A transfer of ordnance units from a first aerial vehicle to a second aerial vehicle performed while both vehicles are airborne. The first aircraft is used as an ordnance storage, ordnance delivery and ordnance supplier platform. The second aircraft has the functionality and capability of delivering the received ordnance to designated targets. The first aircraft includes an ordnance storage apparatus, an ordnance transfer assembly, a computer-based highly accurate ordnance transfer control apparatus, and an ordnance transfer apparatus operating crew. The ordnance transfer assembly establishes temporarily a transfer link between the aircraft and utilizes an ordnance conveyor mechanism for the delivery of the ordnance units. The second aircraft includes a multi-use multi-purpose pylon that receives the transferred ordnance in the proper manner. The aircrafts can be uninhabited.

38 Claims, 9 Drawing Sheets

U.S. PATENT DOCUMENTS

| | | |
|---|---|---|
| 6,540,179 B2 | 4/2003 | Henderson |
| 6,651,933 B1 * | 11/2003 | von Thal et al. ............ 244/136 |
| 6,932,299 B2 * | 8/2005 | Beyerle et al. ........... 244/137.4 |
| 2002/0079407 A1 * | 6/2002 | Lounge et al. .............. 244/161 |
| 2005/0145752 A1 * | 7/2005 | Beyerle et al. ........... 244/137.4 |

FOREIGN PATENT DOCUMENTS

| | | |
|---|---|---|
| JP | 01254494 A * | 10/1989 |
| JP | 4-66398 | 3/1992 |

OTHER PUBLICATIONS

International Search Report dated Jan. 6, 2005 from PCT/IL2004/00152.

* cited by examiner

APPARATUS AND METHOD FOR AIR-TO-AIR ARMING OF AERIAL VEHICLES

BACKGROUND OF THE INVENTION

1. Field of the Invention

The present invention generally relates to the air-to-air supply of aerial vehicles and more particularly to an apparatus and method for the air-to-air arming of manned and unmanned combat aerial vehicles.

2. Discussion of the Related Art

The restricted storage and delivery capabilities of a typical combat aircraft are limited. Likewise, the quantity of the expandable on-board fuel and weapon stores is also limited. Because the effective duration of an air combat mission is relatively long and because the number of targets that could be attacked depends directly on the quantity of fuel and weapon stores carried, stores must be replenished. Traditionally, in order to continue an air combat mission, when the combat aircraft exhausts the fuel or weapon stores, the aircraft is compelled to exit the combat area and return to a typically distant ground station (air base) or naval station (aircraft carrier) to be re-fuelled, re-armed and optionally to be provided with new or updated intelligence information. Subsequently, the aircraft could return to the combat area and continue the mission. Thus, replenishing of fuel and weapon stores of an aircraft and providing the required intelligence or target data in the traditional manner involves a substantial amount of non-combat time. The non-combat time period includes a two-way air trip between the typically distant ground or naval station and the air combat area, landing, ground taxiing, re-fuelling, re-arming, intelligence briefing and taking-off.

During the last few decades the fuel supply factor has been gradually alleviated by the development, implementation and refinement of the aerial refueling systems and methods involving what are referred to as a probe and drogue procedure. The intelligence and target data or information required by aircrew is increasingly delivered by high-speed, enhanced-bandwidth data link systems that provide unidirectional or bi-directional transmission of mission-specific intelligence in real-time. Other advanced solutions concerning the provision of intelligence or target data has emerged, such as for example, the provision of target data via satellite that enables attacks on out-of-visual-range targets. The aerial fuelling option and the availability of the new systems for the provision of intelligence/target data both provide the viable option of prolonging the combat time period of the aircraft.

Presently the weapon supply factor or the arming of the aircraft remains the principal bottleneck that hinder the ongoing efforts for prolonging substantially the effective combat time period associated with an air combat mission. The prevailing tendency in the air forces of the world is to reduce significantly the number of operational combat aircraft due to high cost of modern aerial platforms. Modern combat aircraft also carry less, yet more effective "smart" ordnance. As a result the operational requirements from a combat aircraft include improved versatility and single mission-specific efficiency.

It will be readily appreciated by one with ordinary skills in the art that a new apparatus and operating method is required for dealing with the weapon re-supply factor in order to improve ordnance delivery capacity, to reduce the length of non-combat periods between attacks, to increase the number of attacks in a given period, and as a result to enhance the efficiency of the air power.

SUMMARY OF THE PRESENT INVENTION

One aspect of the present invention regards an apparatus for the air-to-air transfer of at least one ordnance unit from a first airborne aerial vehicle to a second airborne aerial vehicle. The apparatus comprising an ordnance storage rack installed within a cargo space of the first airborne aerial vehicle to provide pre-transfer storage space to an at least one ordnance unit, a multi-use, multi-purpose pylon installed on the second airborne aerial vehicle and intended to receive an at least one ordnance unit transferred from the first airborne aerial vehicle to the second airborne aerial vehicle, an at least one transferable ordnance unit intended to be transferred from the first airborne aerial vehicle to the second airborne vehicle and positioned prior to the transfer on the ordnance storage rack installed within the cargo space of the first airborne aerial vehicle, an ordnance transfer control assembly installed in the first aerial vehicle providing for the automatic, semi-automatic, or manual control of the air-to-air ordnance transfer apparatus between the first airborne aerial vehicle and the second airborne aerial vehicle to enable automatic, semi-automatic, or manual controlling of the movement of the extended mechanical arm in a bi-directional, multi-axis, compound trajectory between the first airborne aerial vehicle and the second airborne aerial vehicle, and an extendible mechanical arm assembly installed within the cargo space of the first airborne aerial vehicle attached at the first end to the internal body of the cargo space of the first airborne aerial vehicle with a second end provided with a substantial freedom of movement. The mechanical arm comprises a longitudinal mechanical body providing for the freedom of movement to the second end of the ordnance transfer assembly where the movement is directed toward the multi-use, multi-purpose pylon device uploaded on an externally or internally located weapon station of the second airborne aerial vehicle, power generator device to provide controlled power for the bi-directional, multi-axis movement of the mechanical body between the first aerial vehicle and the second aerial vehicle in a compounded trajectory, and an ordnance transfer assembly installed on the mechanical body providing for the carriage of the at least one ordnance unit from the first airborne aerial vehicle to the second airborne aerial vehicle.

A second aspect of the present invention regards a method for the air-to-air transfer of at least one ordnance unit from a first airborne aerial vehicle to a second airborne aerial vehicle. The method comprises loading manually, automatically or semi-automatically an at least one ordnance unit or an at least one ordnance assembly into an ordnance storage rack installed within an internal cargo space of the first airborne aerial vehicle, transferring manually, automatically or semi-automatically the at least one ordnance unit or the at least one ordnance assembly from the ordnance storage rack installed within the cargo space of the first airborne aerial vehicle into an ordnance carriage cradle associated with a manipulable, extendible mechanical arm secured at the first end to the body of the interior cargo space of the first airborne aerial vehicle while the second end is provided with a freedom of movement to enable bi-directional, multi-axis movement of the second end between the first airborne aerial vehicle and the second airborne aerial vehicle, establishing a pre-defined ordnance transfer method-specific flight formation consisting of the first airborne aerial vehicle and the second airborne aerial vehicle, activating the manipulable, extendible mechanical arm in order to initiate the ordnance transfer procedure, manipulating automatically, semi-automatically the extendible mechanical arm and the associated ordnance conveyor mechanism to provide for the bi-directional, multi-axis movement of the mechanical arm in a compound trajectory between the first airborne aerial vehicle and the second airborne aerial vehicle, establishing contact between the second end of the mechanical arm and the second airborne aerial vehicle via the manipulation of the mechanized arm, establishing contact between the at least one ordnance unit or the at least one ordnance assembly the multi-use, multi-purpose pylon uploaded on n external or internal weapon station on the second airborne aerial vehicle, and attaching the at least one ordnance unit or the at least one ordnance assembly to the multi-use, multi-purpose pylon.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
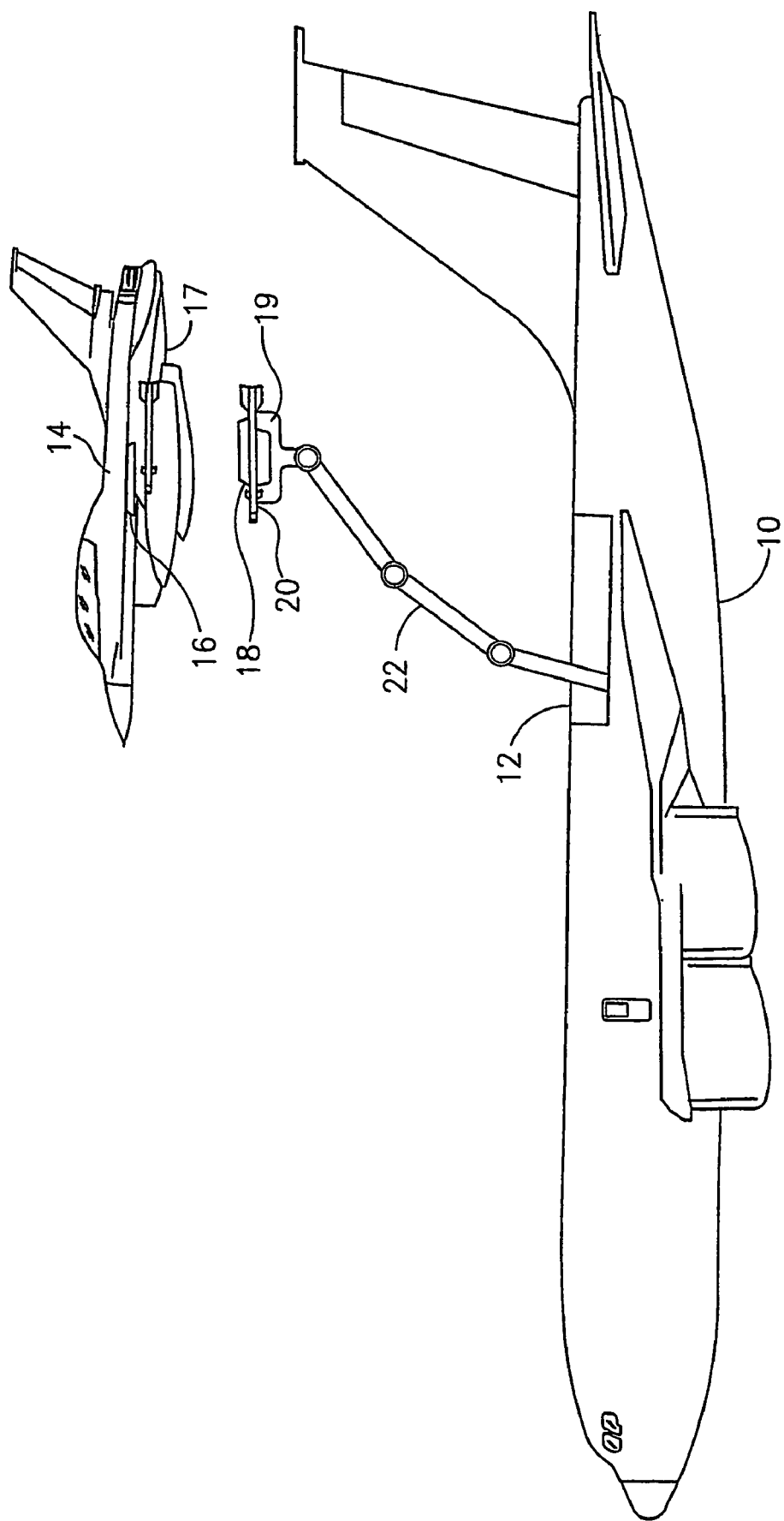
FIG. 1 is a schematic view showing a supplier (first) aircraft transferring ordnance to a receiver (second) aircraft, in accordance with the first preferred embodiment of the present invention.

A novel apparatus and method for airborne arming of aerial vehicles are disclosed. The apparatus and method are operative in transferring ordnance from a supplier aerial vehicle to a receiver aerial vehicle while both aerial vehicles are airborne. The supplier aerial vehicle may be a cargo aircraft suitably modified to be used as an ordnance storage, ordnance delivery and ordnance supplier platform. In an alternative embodiment, the supplier aerial vehicle comprises fuel storage, fuel delivery and fueling capabilities as well, in order to provide simultaneously both fueling and arming functionalities. In a preferred embodiment of the disclosed subject matter, the supplier aircraft is a McDonnell Douglas C-17 Globemaster III. In other preferred embodiments of the disclosed subject matter, similar aircraft may be used, such as a Boeing C-5 Galaxy, a Lockheed Martin C-130 Hercules, and the like. In yet other preferred embodiments of the disclosed subject matter, an unmanned or uninhabited cargo aircraft may be used as the supplier aerial vehicle. In preferred embodiments of the disclosed subject matter, the receiver aerial vehicle is a fighter aircraft which is typically equipped with air-to-air missiles, and/or electronic/thermal countermeasures. In other preferred embodiments, the supplier aerial vehicle may be one of a plurality of diverse combat aerial vehicles, such as an attack aircraft, a bomber aircraft, an attack helicopter, a Unmanned Aerial Vehicle or a Uninhabited Aerial Vehicles (UAVs), a Unmanned Combat Aerial Vehicle or a Uninhabited Combat Aerial Vehicle (UCAVs), a diverse space platform, and the like.

In some exemplary embodiments of the disclosed subject matter, the receiver aerial vehicle, also referred to as a receiver aircraft, has a functionality and capability of delivering a received ordnance to designated targets. The supplier aerial vehicle, also referred to as a supplier aircraft may be utilized as a sophisticated arming platform and may preferably include an automated ordnance storage apparatus, an ordnance transfer assembly, a computer-based highly accurate ordnance transfer apparatus. The computer-based transfer apparatus may be used to control an operation of the ordnance transfer assembly. The control may be either automatically, semi-automatically or manually in order to achieve a highly accurate physical connection between designated weapon stations of the receiver aircraft and a body of the ordnance transfer assembly, and an ordnance transfer apparatus operating crew (human ordnance transfer controllers) to operate the ordnance transfer apparatus, to monitor the transfer procedure and optionally to execute the transfer procedure manually by manipulating and guiding of the ordnance transfer assembly. The ordnance transfer assembly is designed and developed such as to carry the transferable ordnance units either within a specifically designed ordnance-carriage-cradle installed on the distal (second) end of the assembly, or to feed distinct transferable ordnance units via specific conveyor mechanisms internally installed in or externally attached to the ordnance transfer assembly. The transfer of the ordnance units is performed following the formation of a temporary mechanical link between the supplier vehicle and the receiver vehicle via the ordnance transfer assembly. Note should be taken that when the ordnance transfer procedure involves an unmanned supplier aerial vehicle the procedure could be either fully automatic or could be appropriately controlled from a ground control station where the control commands will be transmitted via a high-speed, enhanced-bandwidth data link established between the ground station and the unmanned supplier aerial vehicle.

The receiver aerial vehicle carries on the designated weapon stations either existing multi-purpose pylons or specifically designed and developed multi-purpose pylons. The location of the weapon stations varies across different aerial vehicles. Thus, fighter/bombers are typically equipped with external weapon stations located either on the lower surface of the aircraft, such as under the wings or under the fuselage, or on the wingtips. Additionally fighter/bombers could further have internal weapon bays. Some specific combat vehicles, such as the F-117 stealth bomber, utilize internal weapon bays exclusively, in order to reduce the radar signature. Yet other specialized-use aerial combat vehicles, such as the V-8 Harrier SVTOL fighter/bomber, are provided with weapon station located on the upper surface of the wings. The present invention will provide solutions for the Air-to-Air arming of aerial vehicles irrespective of the location of the weapon stations.

The ordnance transfer assembly transfers from the supplier aerial vehicle to the receiver aerial vehicle either a transferable ordnance assembly that includes one or more ordnance units linked detachably and rigidly to an ordnance-specific pylon adapter or one or more distinct ordnance units conveyed between the aerial vehicles through an internally installed or externally mounted ordnance conveyor devices. The pylon adapter is capable of connecting to the multipurpose pylon. The multi-purpose pylon is uploaded on the designated weapon stations associated with specific hard points located on the receiver aerial vehicle either under the wings of the vehicle or within a weapon bay. The pylon adapter unit may include an embedded multi-fuze magazine for the automatically activated or manually initiated fuzing of the ordnance units consequent to the ordnance transfer. Alternatively, the ordnance units could be transferred with pre-installed fuzes that could be activated either mechanically or electronically after the completion of the ordnance transfer. Where applicable, specifically installed and engaged arming cables are transferred with the ordnance units from the supplier aerial vehicle to the receiver aerial vehicle.

In the first and the second preferred embodiment of the present invention, the ordnance transfer assembly is a mechanized arm assembly comprising several mechanized arm sections interlinked by flexible and motorized joints and includes suitable actuator units to provide multi-axis movements to the arm sections in respect of each other such as roll, pitch, yaw, pan, tilt and the like. The mechanized arm assembly further includes one or more foldable aerodynamic control surfaces to provide for aerodynamic lift and control. The mechanized arm assembly is secured at its base (the first end) to an internal cargo bay of the supplier aerial vehicle while the distal (second) end of the mechanized arm assembly is free to maneuver and includes the ordnance-carriage-cradle for the carrying the transferable ordnance assembly. The mechanized arm assembly could optionally include one or more image acquiring devices, such as video cameras, in order to feed mechanized arm assembly-position-specific video images into a close circuit TV apparatus associated with the ordnance transfer apparatus to allow for close monitoring of the ordnance transfer procedure and for providing precise automatic, semi-automatic or manual control of the mechanized arm assembly during the various phases of the ordnance transfer procedure. The mechanized arm assembly could further include regular and infrared lighting fixtures and one or more regular and infrared cameras to enable nighttime operations. The mechanized arm assembly forms a mechanical link between the supplier aerial vehicle and the receiver aerial vehicle for each separate transfer process of each separate ordnance transfer assembly. The ordnance transfer assembly could further include proximity sensing means, contact-activated control and monitoring devices and the like. In addition, the supplier aerial vehicle is provided with appropriate lighting means to assist with the controlling of the ordnance transfer.

In the third preferred embodiment of the present invention, the ordnance transfer assembly is a probe assembly formed by a plurality of telescoping tubes, which are provided with the capability of being extracted and retracted from an internal cargo bay of the supplier aircraft. The telescopic probe assembly is linked to a mechanized arm assembly that includes the ordnance-carriage-cradle for carrying the transferable ordnance assembly. The telescopic probe when fully retracted is completely enclosed within the internal cargo hay of the supplier aerial vehicle. The telescopic probe assembly further includes one or more video cameras to feed telescopic probe-position-specific video images into a close circuit TV apparatus associated with the ordnance transfer apparatus to allow for close monitoring of the ordnance transfer procedure and for providing precise automatic, semi-automatic or manual control of the telescopic probe during the various phases of the transfer procedure. The telescopic probe further includes image acquisition devices, such as cameras, lighting means, and infrared viewing means to enable nighttime operations. The telescopic probe further includes foldable aerodynamic lifting and control surfaces. The telescopic probe and the associated mechanized arm assembly are operative in the formation of a mechanical link between the supplier aerial vehicle and the receiver aerial vehicle for the continuous feeding of the required ordnance units from the supplier aerial vehicle to the receiver aerial vehicle. The telescopic probe assembly could further include proximity sensing means, contact-activated control and monitoring devices and the like.

In the fourth preferred embodiment of the present invention, the ordnance transfer assembly is a boom assembly including a rigid tube enclosing an internally installed ordnance conveyor mechanism. The boom assembly forms a mechanical link between the supplier aerial vehicle and the receiver aerial vehicle for the completion of the entire ordnance transfer procedure. Following the suitable linking of the supplier and receiver aerial vehicles, the boom assembly is operative in the continuous feeding of a required set of distinct ordnance units from the supplier aerial vehicle to the receiver aerial vehicle. Subsequent to the completion of the ordnance transfer process the boom assembly is disengaged from the receiver aerial vehicle and is fully retracted into the internal cargo bay of the supplier aircraft. The boom assembly is provided with one or more video cameras to feed ordnance transfer assembly-position-specific video images into a close circuit TV apparatus associated with the ordnance transfer apparatus to allow for close monitoring of the ordnance transfer procedure and for providing precise automatic, semi-automatic or manual control of the ordnance transfer assembly during the various phases of the transfer procedure. The boom assembly further includes lighting means and infrared viewing means to enable nighttime operations, and foldable aerodynamic lifting and control surfaces to assist in the control of the boom assembly. The boom assembly could further include proximity sensing means, contact-activated control and monitoring devices and the like.

In the fifth preferred embodiment of the present invention, the ordnance transfer assembly is a mechanized arm assembly comprising several mechanized arm sections interlinked by flexible and motorized joints and includes suitable actuator units to provide multi-axis movements to the arm sections in respect of each other such as roll, pitch, yaw, pan, tilt and the like. The mechanized arm assembly further includes lighting means and infrared viewing means to enable nighttime operations, and foldable aerodynamic lifting and control surfaces to assist in the control of the boom assembly.

The mechanized arm assembly could further include proximity sensing means, contact-activated control and monitoring devices and the like. The mechanized arm assembly is secured at its base (the first end) to the interior of the internal cargo bay of the supplier aerial vehicle while the distal (second) end of the mechanized arm assembly is free for maneuvering. The mechanized arm assembly further includes an externally mounted ordnance conveyor mechanism for the transfer of ordnance from the supplier aerial vehicle to the receiver aerial vehicle. The externally mounted conveyor mechanism is extended along the entire length of the mechanized arm assembly. The externally mounted conveyor mechanism is collapsible in accordance with the changing spatial configuration of the mechanized arm assembly. The mechanized arm assembly further includes one or more image acquiring devices, such as video cameras, designed to feed optionally mechanized arm assembly-position-specific video images into a close circuit TV apparatus associated with the ordnance transfer apparatus to allow for close monitoring of the ordnance transfer procedure and for providing precise automatic, semi-automatic or manual control of the mechanized arm during the various phases of the transfer procedure. The mechanized arm assembly establishes a primary mechanical link between the supplier aerial vehicle and the receiver aerial vehicle that enables mutual stabilization of the supplier and the receiver aerial vehicles, allows for the controlled movement of ordnance load from the supplier ordnance load to the receiver ordnance load, and thereby provides for uploading of ordnance to the suitable weapon station.

The link could be established for the duration of the entire ordnance transfer process for the receiver aerial vehicle or for the duration of an ordnance transfer process for a specific weapon station. The link could be established either with the ordnance positioned at the distal end of the link or alternatively positioned at any point along the length of the link. In addition, the link could be first established and then the ordnance could be placed on the link from the supplier aerial vehicle and then impelled towards the receiver aerial vehicle along the length of the link. Subsequent to the linking of the aircraft the mechanized arm external conveyor assembly is operative in the feeding of a required set of distinct ordnance units from the supplier aerial vehicle to the receiver aerial vehicle. Subsequent to the completion of the ordnance transfer process the mechanized arm assembly is suitably disconnected from the receiver aircraft and retracted completely or partially into the internal cargo bay of the supplier aerial vehicle. The mechanized arm assembly could further include proximity sensing means, contact-activated control and monitoring devices and the like.

In the sixth preferred embodiment of the present invention, the ordnance transfer assembly utilizes a collapsible mechanized arm assembly comprising several arm sections. When in a collapsed (folded) state, the mechanized arm assembly is stored within the interior cargo space of the supplier aerial vehicle. The first arm section of the mechanized arm assembly is physically attached at one end to the body of the supplier aerial vehicle via a flexibly configured link mechanism that provides multi-axis movement to the linked arm section attachment. The other end of the first arm section is linked to a second arm section while the second arm section is linked to a third section. Thus, mechanized arm assembly is constituted of several semi-rigidly inter-connected arm sections where the distal (second) arm section includes a set of collapsible aerodynamic control surfaces.

The mechanized arm assembly is designed to be transformed from the collapsed (folded) state to an extended (unfolded) state by gradual and successive sliding of the constituting arm section outward from the interior of the supplier aerial vehicle via a suitable opening into the air stream behind the supplier aerial vehicle toward a receiver aerial vehicle positioned behind and below the supplier aerial vehicle. When an arm section reaches the limit of its pre-defined movement the next arm section commences to move slideably until all the sections are extended from the supplier aerial vehicle and form a rigid mechanized arm assembly. When in the collapsed (folded) state, the arm sections form a stack containing the first arm section in the lowest position in the stack and the distal arm section in the uppermost position in the stack. During the extension of the mechanical arm, the arm sections are gradually move outward through the opening in the body of the supplier aerial vehicle into the air stream trailing the supplier aerial vehicle in order to form a rigid but maneuverable mechanical "bridge" between the supplier aerial vehicle and the close vicinity of the receiver aerial vehicle. The arm sections of the mechanized arm assembly are interlinked by a flexible connection that enables outward and inward movement of each arm section in relation to the neighboring arm sections. The flexible link that is physically connecting the first arm section to the interior of the supplier aircraft provides multi-axis movements to the entire mechanized arm assembly in respect to the supplier aircraft and the receiver aircraft, such as roll, pitch, yaw, pan, tilt and the like. These movements provide for a substantially precise positioning of the distal end of the mechanical arm assembly in relation to the location of the receiver aircraft.

The mechanized arm assembly further includes a set of externally mounted movement guidance bars, and a conveyor mechanism coupled to an ordnance-carriage-cradle device. The movement guidance bars extend along the entire length of the mechanical arm assembly. Following the implementation of the mechanical link between the supplier aircraft and a location in the close vicinity of the receiver aircraft by the extension of the mechanical arm assembly the ordnance-carriage-cradle carrying a transferable ordnance unit is positioned on the movement guidance bars in the supplier aircraft and coupled to the ordnance conveyor mechanism. Consequently, the ordnance conveyor mechanism is activated in order to move the ordnance-carriage-cradle in a controlled manner from the supplier aircraft along the mechanical arm assembly toward the receiver aircraft. When physical contact is accomplished between the ordnance-carriage-cradle and a pre-determined ordnance carrier pylon installed on the receiver aircraft a set of mechanical operations are performed automatically in order to fasten the ordnance unit carried by the ordnance-carriage-cradle to the pylon. Subsequently, the cradle is disconnected from the ordnance unit and the direction of the movement of the ordnance conveyor mechanism is reversed. The ordnance-carriage-cradle is driven by the ordnance conveyor mechanism to move along the mechanical arm assembly backwards toward the supplier aircraft in order to enable repeated loading of ordnance thereon and repeated transfers of ordnance to one or more pylons installed on the receiver aircraft or aircrafts. In the initial phase of the extension of the mechanized arm assembly the collapsed aerodynamic control surfaces are automatically unfold to provide aerodynamic lift and control to the mechanized arm assembly and later the bombs. The extension and retraction of the mechanized arm, the loading, ordnance on the ordnance transfer cradle and the controlling of the orientation and movement of the mechanical arm in relation to the receiver aircraft are performed by manual operation in combination with a computerized control apparatus where the operators and the computerized apparatus are situated in the supplier aircraft. In an alternative embodiment the process is controlled by computer software or optionally by a human controller. The mechanized arm further includes lighting means and infrared viewing means to enable nighttime operations. The mechanized arm assembly could further include proximity sensing means, contact-activated control and monitoring devices and the like. The mechanized arm assembly further includes one or more video cameras to feed mechanized arm assembly-position-specific video images into a close circuit TV apparatus associated with the ordnance transfer apparatus to allow for close monitoring of the ordnance transfer procedure and for providing precise automatic, semi-automatic or manual control of the mechanized arm during the various phases of the transfer procedure. The physical link between the supplier aircraft and a location in the close vicinity of the receiver aircraft could be established for the duration of the entire ordnance transfer process for the receiver aircraft or for the duration of an ordnance transfer process for a specific weapon station The external conveyor mechanism is operative in the feeding of a required set of distinct ordnance units from the supplier aircraft to the receiver aircraft. Subsequent to the completion of the required set of ordnance transfer procedures the mechanized arm assembly is retracted completely or partially into the internal cargo bay of the supplier aircraft.

When a receiver aircraft exhausts its weapon stores during an air combat operation the aircraft exits the air combat area and accesses a pre-defined aerial arming space much in the same manner it would access an aerial refueling space. The specific maneuvers, approach techniques, communication procedures and other operational procedures used during the aerial arming process are substantially similar to those utilized in a standard aerial refueling process. A supplier aircraft is loitering in the aerial arming space while waiting for receiver aircrafts in need of an ordnance transfer. The receiver aircraft and the supplier aircraft optionally establish a communication link and enter in a pre-defined manner into a suitable flight formation. Following the appropriate communicative co-ordination between the supplier aircraft and the receiver aircraft (either manually, automatically or semi-automatically) concerning the type and quantity of the ordnance to be transferred from the supplier aircraft to the receiver aircraft and the number and location of the associated weapon stations capable of receiving transferable ordnance assemblies on the receiver aircraft a suitably variable sequence of actions is established and confirmed by both participants in the transfer process. The ordnance transfer assembly is activated either manually by human controllers of the ordnance transfer apparatus, fully automatically by the ordnance transfer apparatus, or semi-automatically by the ordnance transfer apparatus and the associated human controllers conducting the operation interactively. In accordance with the operating, instructions of the human controllers, or the computer-based software commands of the ordnance transfer apparatus, the automated ordnance storage apparatus retrieves a transferable ordnance assembly or a distinct ordnance unit from specific storage racks installed in the supplier aircraft and loads the ordnance assembly or the distinct ordnance unit in a suitable manner into the ordnance transfer assembly. In the first, second and third embodiment of the present invention, the ordnance assembly is loaded on the ordnance-carriage-cradle unit of the ordnance transfer assembly. In the fourth, fifth, and sixth embodiment of the present invention, one or more ordnance units are fed into the receiving end of the conveyor mechanism internally installed in or externally attached to the ordnance transfer assembly.

In the first, second and third embodiments of the present invention, the ordnance transfer assembly, carrying the transferable ordnance assembly on the ordnance-carriage-cradle, is extended from the supplier aircraft via a specifically designed and implemented ordnance transfer opening in the body of supplier aircraft towards the receiver aircraft flying in a pre-defined location relative to the supplier aircraft Following either the manual commands of human operators or the computer-based software commands of the ordnance transfer apparatus, the ordnance transfer assembly is manipulated purposefully to effect the connection of the carried transferable ordnance assembly to a multi-use multi-purpose pylon that is uploaded on the pre-defined weapon station of the receiver aircraft. Subsequent to the accomplishment of a suitable transferable ordnance assembly-pylon connection, automatically activated stabilizing means in the pylon firmly secure the ordnance assembly on the pylon. Such stabilizing means could include fully automated sway bracing. Consequently, the ordnance-carriage-cradle of the ordnance transfer assembly is disconnected from the ordnance assembly secured on the pylon. The ordnance transfer assembly is manipulated either automatically, semi-automatically, or manually to provide for suitable maneuvering thereof such as to enable the ordnance-carriage-cradle of the ordnance transfer assembly to be retracted into the supplier aircraft. The ordnance could be transferred either in a fuzed or in an un-fuzed state. Following a set of ordnance transfer operations the operating crew of the receiver aircraft either initiates an automatic fusing process or arms the fuzes pre-installed in the ordnance. Consequently, either the uploaded ordnance is automatically fuzed from the multi-fuze magazine in the pylon adapter or the pre-installed fuzes are armed either mechanically or electronically. Optionally, during the performance of the transfer procedures the supplier aerial vehicle's ordnance transfer apparatus controllers and the receiver aircraft's operating crew, such as the pilot, are in constant communication over an open channel. Optionally a suitable advanced communication link could be maintained between the ordnance computer of the receiver aircraft and the ordnance transfer apparatus computer of the supplier aircraft to exchange ordnance transfer-related information in an automatic manner. Following the completion of the entire set of ordnance transfer procedures the receiver aircraft breaks away from arming formation in a pre-defined manner and exits the aerial arming space preferably in order to return to the combat area for the continuation of the combat mission.

In the fourth, fifth, and sixth embodiments of the present invention, the ordnance transfer assembly and the associated internally enclosed or externally mounted conveyor mechanism are extended from the internal cargo bay of the supplier aircraft via an existing or a specifically designed and implemented ordnance transfer opening in the body of supplier aircraft towards the receiver aircraft flying in a pre-defined location relative to the supplier aircraft. Following either the manual commands of human controllers or the computer-based software commands of the ordnance transfer apparatus, the ordnance transfer assembly and the associated internally enclosed or externally mounted conveyor mechanism are manipulated purposefully to effect the connection of the ordnance transfer assembly to a multi-purpose pylon that is uploaded on the pre-defined weapon station of the receiver aircraft. Consequent to linking of the ordnance transfer assembly to the pylon a continuous transfer of distinct ordnance units is initiated via the conveyor mechanism manually, automatically or semi-automatically. Consequent to the completion of the continuous transfer procedure involving the entire set of required ordnance units to the supplier aircraft the ordnance transfer assembly is disconnected from the receiver aircraft. The ordnance transfer assembly is manipulated either automatically, semi-automatically, or manually to provide for suitable maneuvering thereof such as to enable the ordnance transfer assembly and the associated conveyor mechanism to be retracted into the internal cargo bay of the supplier aircraft. The fusing, process and fuze arming options in these embodiments of the invention are substantially similar to those described in association with the first, second and third embodiments of the invention. Optionally, during the transfer procedure the supplier aerial vehicle's ordnance transfer apparatus controllers and the receiver aircraft's operating crew, such as the pilot, are in constant communication over an open channel. Optionally a suitable advanced communication link could be maintained between the ordnance computer of the receiver aircraft and the ordnance transfer apparatus computer of the supplier aircraft to exchange ordnance transfer-related information in an automatic manner. Then, the receiver aircraft breaks away from arming formation in a pre-defined manner and exits the aerial arming space preferably in order to return to the combat area for the continuation of the combat mission.

In emergency situations, such as for example the occurrence of a mechanical failure involving one of the operative elements of the apparatus that prevents the completion of the transfer, the air-to-air ordnance transfer apparatus provides the option of emergency abort in all the preferred embodiments. The ordnance transfer abort procedure could be activated during each and every phase of the ordnance transfer operation. Aborting the ordnance transfer procedure involves the prompt and safe disconnection of the mechanical arm, the ordnance-carriage-cradle, the ordnance adapter device, and the ordnance unit(s) from the receiver aircraft and the immediate separation and distancing of the mechanical arm and its constituent elements from the receiver aircraft. According to the preferred embodiment, to the phase of the operation, and to the prevailing circumstances, several alternative actions could be initiated, such as moving the ordnance-carrier-cradle away from the receiver aircraft back towards the supplier aircraft along the direction guidance rails of the mechanical arm, lowering and retracting the mechanical arm, folding the aerodynamic control surfaces, and the like. The abort procedure could be activated either by the crew of the receiver aircraft, by the crew of the supplier aircraft, or (where an unmanned supplier aircraft is involved) by the ground control crew. Furthermore, in extreme circumstances, the pylon of the receiver aircraft and/or the mechanical arm and/or one or more of the constituent elements thereof could be jettisoned in order to enable the safe separation of the aircraft involved.

It will be easily understood that the above described procedures, processes, operative steps and components of the proposed apparatus and method are exemplary only. The airborne transfer of ordnance could be conducted and accomplished in a variety of other ways. For example, the automated ordnance storage apparatus could be dispensed with where the loading of the transferable ordnance assembly into the end-edge-cradle of the mechanized arm or the feeding of the distinct ordnance units into the conveyor mechanism could be performed manually. The ordnance transfer apparatus could be implemented in a substantially simplified manner such as to allow only manual control of the ordnance transfer assembly. The transfer process could be designed to be practically automated, such as for example to let the ordnance transfer assembly to locate the designated weapon stations independently of the human controllers via the sensing, identification and recognition of specific visual marks and direction indicators attached to the receiver aircraft body.

The proposed apparatus and method provide the option of inter-vehicle transportability where the operative components of the apparatus installed in a specific aircraft could be, in accordance with operational requirements, dismantled and re-installed in another aircraft having identical or similar characteristics.

The proposed apparatus and method could be utilized in the airborne downloading or replacement of ordnance and other equipment from/to an aircraft. For example, the ordnance transfer assembly could remove or replace dysfunctional equipment in order to provide for the safe continuation of a combat mission or for safe return to base.

The proposed apparatus and method provide a number of significant advantages. The advantages relate directly to the issue of air superiority involving the number of operationally available combat aerial vehicles during an air campaign. The advantages are derived by the fact that the adoption of the proposed apparatus and method will effect a massive reduction of the total time required for a combat mission cycle.

One advantage regards the capability of delivering increased quantities of ordnance within a given period of time to the combat area. Another advantage regards the capability of attacking an increased number of targets within a given period of time.

Another advantage regards the option of utilizing a carefully timed method of operation in the first phase of which an unarmed (or partially armed) aircraft is inserted (flown) to an area near the edge of the combat zone. In the second phase of the method the aircraft is armed mid-air. In the third phase of the method, the armed aircraft approaches the combat zone and performs the objectives of the mission by dropping, ejecting, launching, and/or firing the ordnance that was loaded mid-air in the second phase. This method will provide enhanced range to the aircraft during the first phase as a result of reduction of the weight and consequently reduced drag.

Yet another advantage regards the capability to increase the average number of operative aircraft present in the combat area, to prolong the actual combat time, and to substantially enhance the over-all efficiency of the air power.

Still another advantage concerns the reduction of the total number of aircraft required for an air campaign. As a result total airborne aircraft availability for all the diverse combat zones will be substantially optimized.

Yet another advantage regards the maintaining of attacks/operations for a prolonged period regardless of the counter-attacks performed and the resulting damage inflicted on the ground/sea infrastructure by the opposing forces.

Still another advantage regards an enhanced efficiency for the utilization of air power and air power control in ground/sea/air zones.

Referring now to FIG. 1 that shows a supplier aircraft 10 and a receiver aircraft 14 during the performance of an air-to-air ordnance transfer procedure, in accordance with the first preferred embodiment of the invention. The supplier aircraft 10 and the receiver aircraft 14 are shown in-flight while maintaining a flight formation suitable for the airborne transfer of ordnance from the supplier 10 to the receiver 14. The formation involves the flying of the receiver aircraft 14 above and aft to the supplier aircraft 10 in order to expose the weapon stations typically located on the lower surface of the receiver aircraft 14 to the transfer monitoring means of the mechanized arm assembly 22. The transfer of ordnance is performed for the arming the receiver aircraft 14 in accordance with a pre-defined weapon configuration in order to enable the receiver aircraft 14, subsequent to the ordnance transfer procedure, to perform an air combat mission requiring the delivery of the received ordnance to designated targets. The supplier aircraft 10 is an existing cargo aircraft provided with ordnance storage, ordnance delivery and airborne ordnance transfer capabilities. A receiver aircraft 14 is a combat aircraft that is being supplied with ordnance by the supplier aircraft 10 via the performance of an ordnance transfer procedure. The arming procedure is accomplished by the utilization of a sophisticated remotely operated mechanized arm assembly 22. The mechanized arm assembly 22 consists of a set of mechanized arm sections joined via flexible and motorized joints. The base of the mechanized arm assembly 22 is secured rigidly to the supplier aircraft 10 utilizing specific securing means in the internal cargo bay of the aircraft 10. The other parts the mechanized arm assembly 22 are free to move within specifically pre-defined limits where the movements are accomplished by specific actuator units installed on the various mechanized arm sections that are operative in the manipulation of the various joints connecting the different arms. The mechanized arm assembly 22 further includes foldable aerodynamic control surfaces (not shown) in order to provide aerodynamic lift and control to the assembly 22. Prior to the performance of the ordnance transfer procedure the mechanized arm assembly 22 is stored in the internal cargo bay of the supplier aircraft 10 in a folded configuration that provides for a volumetrically efficient storage. When the ordnance transfer procedure is initiated and activated a transferable ordnance assembly 32 is loaded into a specifically designed ordnance-carrier-cradle 19 that is connected rigidly to the distal edge of the uppermost arm section of the mechanized arm assembly 22. The cradle 19 is equipped with specific gripping arms that secure the transferable ordnance assembly firmly to the cradle 19. The ordnance assembly consists of a specific pylon adapter unit 18 and one or more ordnance units 20 attached rigidly and releasably to the pylon adapter unit 18. The manipulation of the mechanized arm assembly 22 is performed in a pre-defined manner in order to effect the formation of a temporary mechanical link between the supplier aircraft 10 and the receiver aircraft 14. The subsequent manipulation of the mechanized arm assembly 22 by ordnance transfer controllers within the supplier aircraft 10 modifies gradually the state of the mechanized arm assembly 22 from the folded state to an unfolded state. During the unfolding of the mechanized arm assembly 22 the interlinked upper mechanized arms successively and controllably exit the body of the supplier aircraft 10 through a specifically designed ordnance transfer opening 12. The distal arm section with the ordnance-carriage-cradle 19 carrying the transferable ordnance assembly is connected thereto is manipulated such as to approach a designated weapon station on the lower surface of the receiver aircraft 14. When the ordnance assembly suitably contacts a multi-use and multi-purpose pylon 16 attached to the weapon station 17, the ordnance assembly is firmly secured to the pylon 16. Consequently, the distal segment of the mechanized arm assembly 22 is disconnected from the transferable ordnance assembly 19. The movement of the mechanized arm assembly 22 is reversed. The mechanized arm assembly 22 is retracted gradually and maneuvered back into the internal cargo bay of the supplier aircraft 10 while the unfolded state of the assembly is gradually modified to a folded state where the modification is suitably synchronized with the retractive movement. At the completion of the ordnance transfer procedure the mechanized arm assembly 22 is stored in its entirety within the internal cargo bay of the supplier aircraft 10 in a folded state. In order to prepare the ordnance 20 for operations, additional procedures such as the automatic stabilizing of the transferable ordnance assembly, and the automatic or manual arming of the fuzes of the ordnance 20 is performed The ordnance transfer procedure could be repeated for the uploading of identical or different transferable ordnance assemblies to the other weapon stations of the receiver aircraft 14. After the performance of the entire set of the required ordnance transfer procedures, the receiver aircraft 14 leaves the flight formation in a pre-defined manner and returns to the combat zone in order to resume operational activities.

The mechanized arm assembly 22 could be operated in a fully automatic mode by an automated ordnance transfer apparatus, in a fully manual mode by an ordnance transfer controller crew or in semi-automatic mode in cooperation with the automated ordnance transfer apparatus and the ordnance transfer controller crew. In the semi-automatic mode, the lower sections of the mechanized arm assembly 22 will be manipulated manually by the ordnance transfer controller while the uppermost (distal) section of the mechanized arm assembly 22 will be manipulated automatically by the ordnance transfer apparatus in order to achieve an optimal connection between the mechanized arm assembly 22 and the receiver aircraft 14. The manipulative operations performed on the mechanized arm assembly 22 are assisted by the lift provided from the aerodynamic control surfaces (not shown) installed on pre-defined locations on the mechanized arm assembly 22.

Note should be taken that the above described procedure is exemplary only. Diverse other flight formations could be used, the movements of the mechanized arm could be performed in different directions, the transferable ordnance assembly could include ordnance only without a pylon adapter, the ordnance could be transferred while fuzed and the fuzes could be activated electronically after the transfer. The location of the ordnance transfer opening could be different, for example in the aft part of the supplier aircraft. The limits of the present invention will be defined by only by the attached claims.

Figure 2:
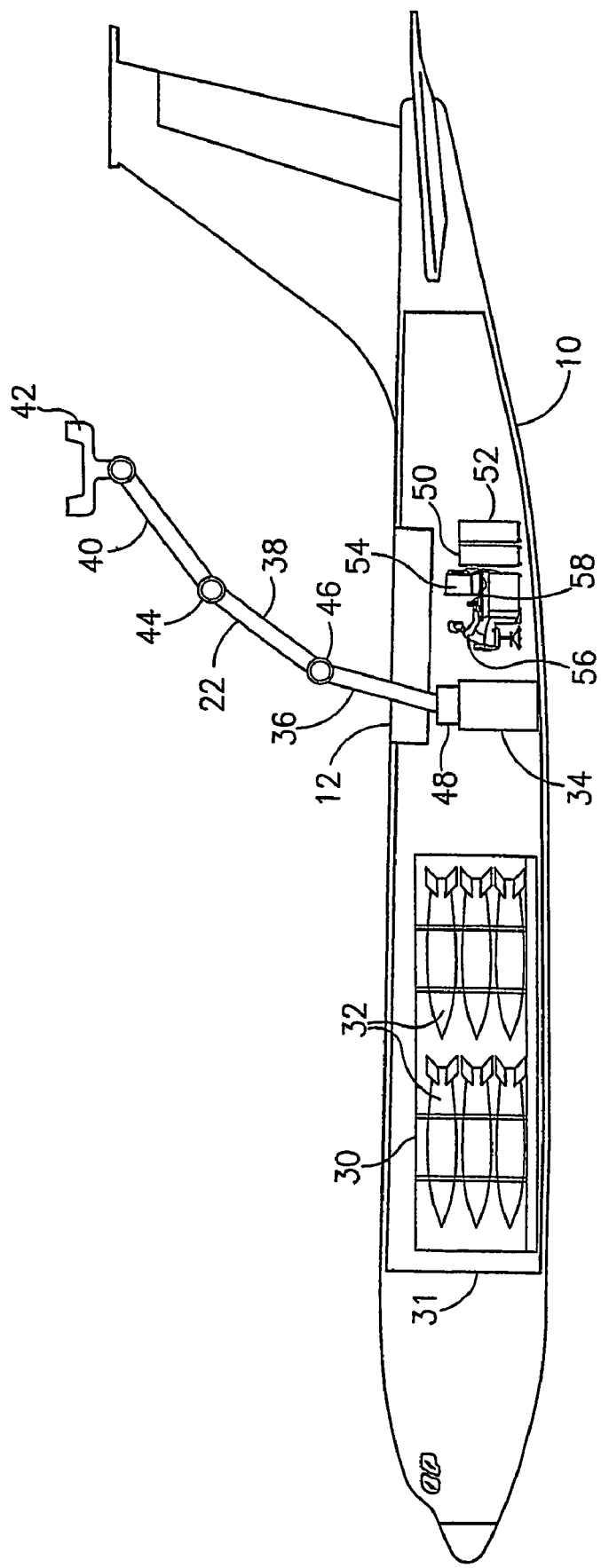
FIG. 2 is a schematic illustration of the airborne ordnance transfer apparatus elements associated with a supplier (first) aircraft, in accordance with the first preferred embodiment of the present invention.

FIG. 2 illustrates in a schematic manner the operative components of the proposed airborne ordnance transfer apparatus installed or operating within the supplier aerial vehicle, in accordance with the first preferred embodiment of the present invention. The supplier aircraft 10 includes an ordnance storage, delivery and transfer area 31. The area 31 comprises a transferable ordnance assembly storage complex 30, a mechanized arm assembly 22, a computing device 50, a communication device 52, a display device 54, a manual control device 58 and an ordnance transfer controller 56. The transferable ordnance assembly storage complex 30 is a set of storage racks holding a plurality of ordnance assemblies 32. The ordnance storage racks consists of horizontal ordnance storage cribs (cradles) and vertical support members. The ordnance assemblies 32 are configured to include specific ordnance units, such as small bombs, missiles, chaff containers, flares, rockets, diverse ECM pods, fully loaded gun pods, and the like. The ordnance assemblies 32 could further include transferable external fuel tanks with or without fuel stores. External fuel tanks without fuel stores could be transferred to an aircraft that for example has been compelled to jettison its external fuel tanks during a critical air-to-air engagement. The transfer of fuel tanks will provide the option of subsequent refueling and continuation of the mission. External fuel tanks loaded with fuel stores could be transferred in order to negate the need for aerial refueling and thereby reducing the period of replenishment. The ordnance assemblies 32 could be configured such as the ordnance units to be attached to specific pylon adapter units in order to enable ready uploading of the ordnance assemblies 32 to the pylons of a receiver aerial vehicle. The transferable ordnance assembly storage complex 30 could be controlled by an automatic ordnance storage apparatus whereby the loading of the transferable ordnance assemblies 32 into the ordnance-carriage cradle of the mechanized arm assembly 22 could be computer-controlled in a manner similar to the know automated storage systems. The loading of the ordnance assemblies 32 to the ordnance-carriage cradle 42 of the mechanized arm assembly 22 could be performed manually by specifically tasked human operators (not shown). The mechanized arm assembly 22 is a set of interlinked mechanized arms 36, 38, 40 and it is capable of handling large payloads. The mechanized arm assembly 22 has several motorized joints 44, 46, 48 to provide for the movement of the interlinked arms 36, 38, 40 through several axes of movement. The base 34 of the mechanized arm assembly 22 is firmly and rigidly attached to the floor of the ordnance storage, delivery and transfer area 31 by the utilization of specific securing means. The mechanized arm assembly 22 is about 60 feet long when fully extended. The mechanized arm assembly 22 can be operated manually by the ordnance transfer controller 56 via the manipulation of a rotational hand controller 58 assisted by the monitoring of the mechanized arm assembly's 22 position via a video display device 54. However, the provision of an automatic or semi-automatic mode in which the mechanized arm assembly 22 moves practically independently along a compound trajectory is also possible. The movements of the mechanized arm assembly 22 is achieved by motors and gears associated with the various joints interlinking the various mechanized arm sections. The automatic movement is enabled by the utilization of specific sensors devices, pre-programmed processor devices, and the like, installed along the length of the mechanized arm assembly 22. The distal arm section 40 of the mechanized arm assembly 22 is linked to the ordnance-carriage-cradle 42 that is situated on the end-edge of the arm section 40. The drawing under discussion shows the mechanized arm assembly 22 fully extended with a portion of the lower arm section 36, the entire length of the middle arm section 38, the entire length of the upper arm section 40 and the ordnance-carriage-cradle extrude from the supplier aircraft 10 via the ordnance transfer opening 12 to the air stream.

Note should be taken that the above described apparatus is exemplary only. Diverse other components could be used the number of interlinked mechanized arm sections, the length of the mechanized arm and the entire configuration of the mechanized arm assembly could be substantially different. For example one or more hydraulically activated cylindrical arm sections could be used. The limits of the present invention will be defined by only by the attached claims.

Figure 3:
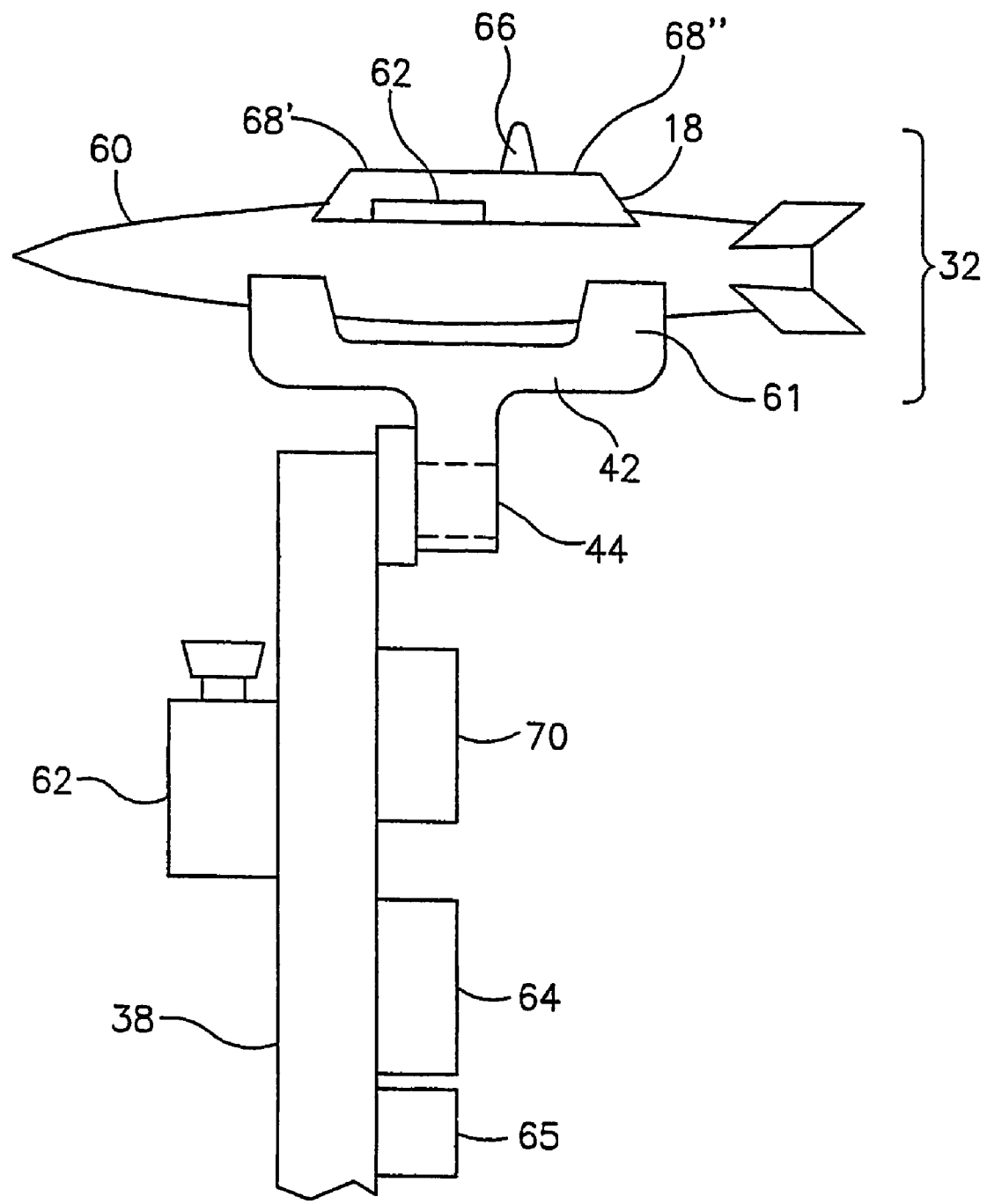
FIG. 3 is a schematic illustration of the upper portion of the remotely controlled mechanized arm showing the end-edge-cradle loaded with a transferable ordnance assembly and other components, in accordance with the first preferred embodiment of the present invention.

Referring now to FIG. 3 which is a schematic illustration of the upper portion of the remotely operated mechanized arm assembly specifically emphasizing the location of the ordnance-carriage-cradle loaded with a transferable ordnance assembly, in accordance with the first preferred embodiment of the present invention. Other operative components of the mechanized arm assembly are also shown in a more detailed manner. The cradle 42 carries a ordnance transfer assembly 32. The ordnance transfer assembly 32 includes a transferable ordnance unit 60, such as one or more bombs attached to a pylon adapter 18. The ordnance transfer assembly 32 is firmly secured to the cradle 42 by several gripping arms 61', 61". The pylon adapter 18 includes a mechanical connector 66 to be used for insertion into a suitable opening in the pylon attached to a targeted weapon station. The pylon adapter 18 further includes several stabilizing surfaces 68', 68", an optional multi-fusing unit 62, and appropriate electrical/data connectors (not shown). The ordnance-carriage-cradle 42 is linked to the upper arm section 40 of the mechanized arm assembly 22 via a motorized joint 44 that provides for the planar movement of the ordnance-carriage-cradle 42. The upper arm section 38 further includes a camera 62 for the monitoring of the position of the cradle 42 in relation to the pylon, a drive unit 64 for imparting suitable movement to the joint 44, and a processor device 70 to provide for the automatic control of the movement of the joint 44. An additional cradle gripping arms motor 65 effects the closing of the gripping arms 61', 61" subsequent to the loading of the ordnance transfer assembly 32 into the cradle 42 and for the opening the of the cradle grip arms 61', 62" subsequent to the securing of the ordnance transfer assembly 32 to the pylon.

Note should be taken that the above described part of the mechanized arm assembly is exemplary only and could be entirely different in other preferred embodiments of the invention. For example the assembly could include proximity devices, micro-switches or other sensors to provide for precise maneuvering.

The mechanized arm assembly could further carry integrated communication devices to communicate between the attached processors and the motors or between the arm-attached processors and the computers of the supplier aircraft or the computers of the receiver aircraft. The limits of the present invention will be defined by only by the attached claims.

Figure 4:
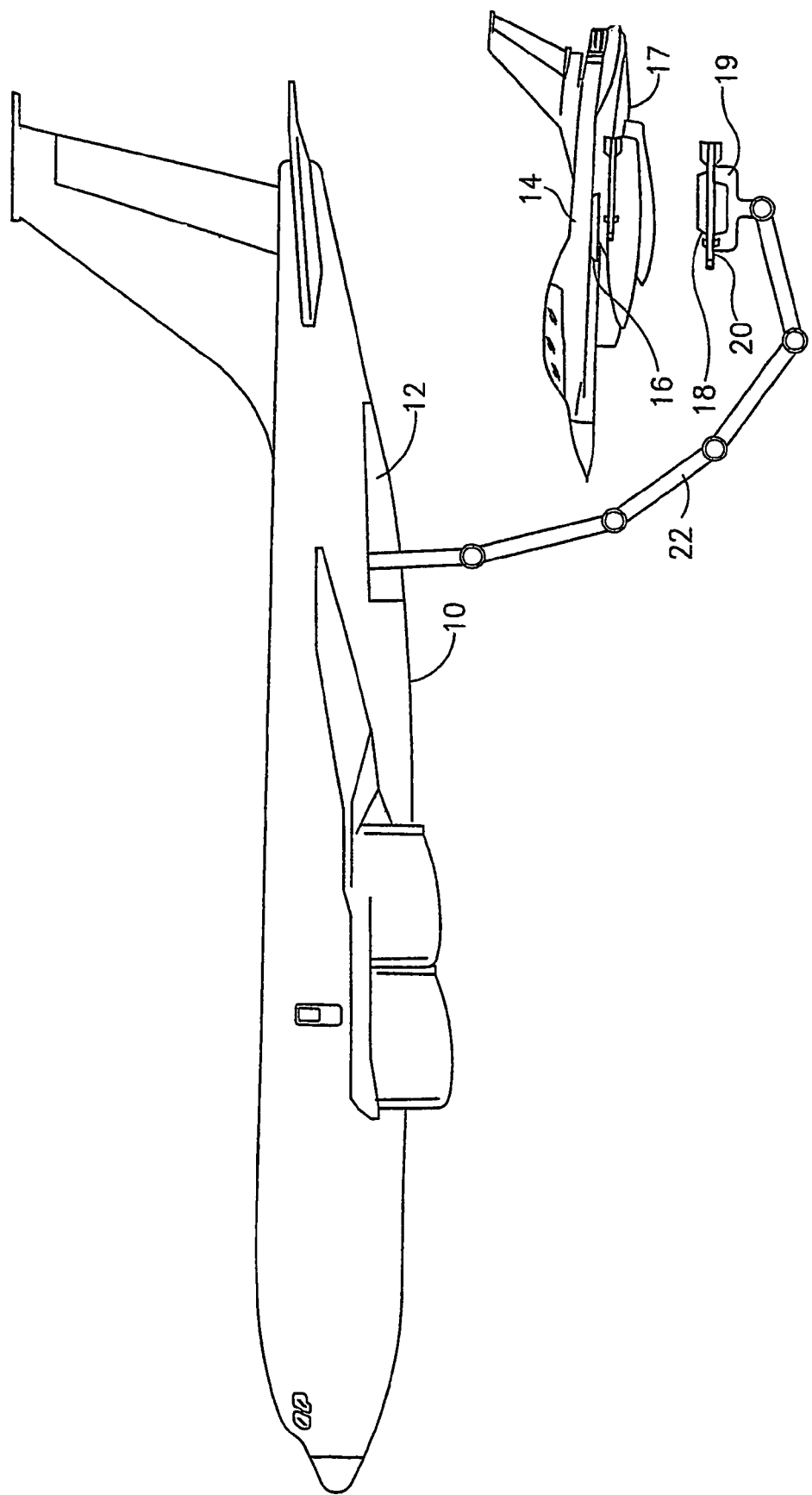
FIG. 4 is a schematic view showing a supplier (first) aircraft transferring ordnance to a receiver (second) aircraft, in accordance with the second preferred embodiment of the present invention.

Referring now to FIG. 4 that shows a supplier aircraft 10 and a receiver aircraft 14 during the performance of an air-to-air ordnance transfer procedure, in accordance with the second preferred embodiment of the invention. The supplier aircraft 10 and the receiver aircraft 14 are shown in-flight while maintaining a flight formation suitable for the airborne transfer of ordnance from the supplier 10 to the receiver 14. The formation involves the flying of the receiver aircraft 14 below and aft to the supplier aircraft 10. Note should be taken that the spatial relationships between the aircraft involved in the procedure could differ in accordance with the rules of formation flying (approach limitations, optimal airflow, operational considerations, and the like). In addition, the number and type of the transferable ordnance and the number, location, and type of the weapon stations that can be armed could differ in accordance with the type of aircraft.

The transfer of ordnance is performed for the arming the receiver aircraft 14 in accordance with a pre-defined weapon configuration in order to enable the receiver aircraft 14, subsequent to the ordnance transfer procedure, to perform an air combat mission requiring the delivery of the received ordnance to designated targets. The supplier aircraft 10 is an existing or prospective cargo aircraft provided with ordnance storage, ordnance delivery and airborne ordnance transfer capabilities. A receiver aircraft 14 is a combat aircraft that is being supplied with ordnance by the supplier aircraft 10 via the performance of an ordnance transfer procedure. The arming procedure is accomplished by the utilization of a sophisticated remotely operated mechanized arm assembly 22. The mechanized arm assembly 22 consists of a set of mechanized arm sections joined via flexible and motorized joints. The base of the mechanized arm assembly 22 is secured rigidly to the supplier aircraft 10. The other parts the mechanized arm assembly 22 are free to move within pre-defined limits where the movement is accomplished by specific actuator units (assisted by aerodynamic lift provided by one or more foldable aerodynamic control surfaces) installed on the various mechanized arm sections that manipulate the various joints connecting the different arms. Prior to the performance of the ordnance transfer procedure the mechanized arm assembly 22 is stored in the internal cargo bay of the supplier aircraft 10 in a folded configuration providing for volumetrically efficient storage. When the ordnance transfer procedure is initiated and activated a transferable ordnance assembly is loaded into a specifically designed ordnance-carrier-cradle 19 that is connected rigidly to the upper edge of the uppermost arm section of the mechanized arm assembly 22. The cradle 19 is equipped with specific gripping arms that secure the transferable ordnance assembly firmly to the cradle 19. The ordnance assembly consists of a specific pylon adapter unit 18 and one or more ordnance units 20 attached rigidly and releasably to the pylon adapter unit 18. The manipulation of the mechanized arm assembly 22 is performed in a pre-defined manner in order to effect the formation of a temporary mechanical link between the supplier aircraft 10 and the receiver aircraft 14. The subsequent manipulation of the mechanized arm assembly 22 by ordnance transfer controllers within the supplier aircraft 10 modifies gradually the state of the mechanized arm assembly 22 from the folded state to an unfolded state. During the unfolding of the mechanized arm assembly 22 the interlinked upper mechanized arms successively and controllably exit the body of the supplier aircraft 10 through an existing or a specifically designed ordnance transfer opening 12. The uppermost arm section with the ordnance-carriage-cradle carrying the transferable ordnance assembly 19 connected to the distal end thereof is manipulated such as to approach a designated weapon station installed on the receiver aircraft 14. When the ordnance assembly 19 suitably contacts a multi-purpose pylon 16 attached to the weapon station 17, the ordnance assembly is firmly secured to the pylon 16. Consequently, the distal segment of the mechanized arm assembly 22 is disconnected from the transferable ordnance assembly. Then the movement of the mechanized arm assembly 22 is reversed. The mechanized arm assembly 22 is retracted gradually in order to be returned into the interior cargo hay of the supplier aircraft 10 while the unfolded state of the assembly is gradually modified to a folded state. The state modification is suitably synchronized with the retractive movement. At the completion of the ordnance transfer procedure the mechanized arm assembly 22 is stored in its entirety within the interior of the supplier aircraft 10 in a folded state. In order to prepare the ordnance 20 for operations additional procedures such as the automatic stabilizing of the transferable ordnance assembly, the automatic or manual or electrical fusing of the ordnance 20, and the automatic or manual or electrical arming of the fuzes are performed. The ordnance transfer procedure could be repeated for the uploading of identical or different transferable ordnance assemblies to the other weapon stations of the receiver aircraft 14. After the performance of the entire set of the required ordnance transfer procedures, the receiver aircraft 14 leaves the flight formation in a pre-defined manner in order to return to the combat zone for the continuance of an air combat mission and in order to enable other aircraft to enter the formation with the supplier aircraft 10 in order to be receive ordnance from the supplier aircraft.

Figure 5:
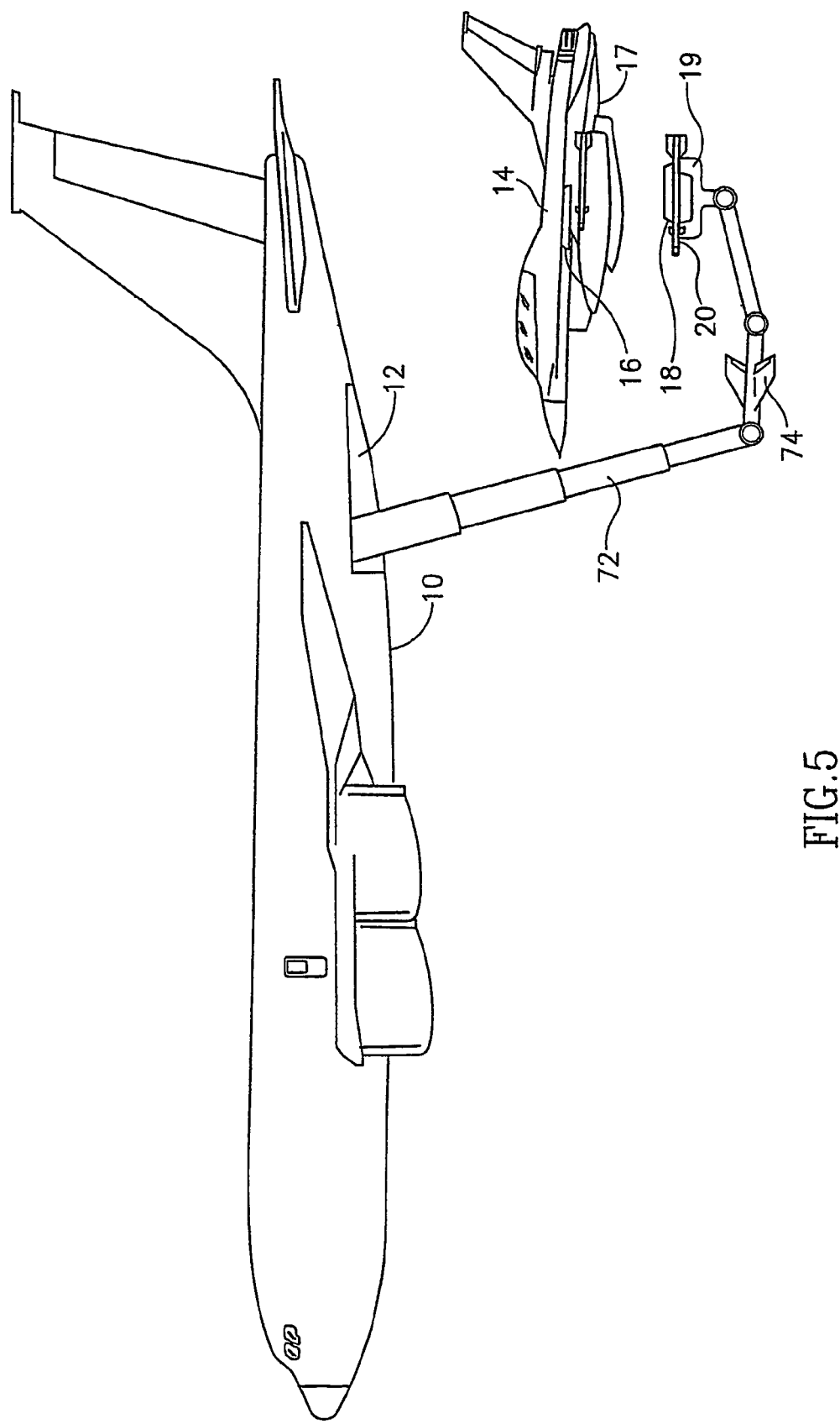
FIG. 5 is a schematic view showing a supplier (first) aircraft transferring ordnance to a receiver (second) aircraft, in accordance with the third preferred embodiment of the present invention.

Referring now to FIG. 5 that shows a supplier aircraft 10 and a receiver aircraft 14 during the performance of an air-to-air ordnance transfer procedure, in accordance with the third preferred embodiment of the invention. The supplier aircraft 10 and the receiver aircraft 14 are shown in-flight while maintaining a flight formation suitable for the airborne transfer of ordnance from the supplier aircraft 10 to the receiver aircraft 14. The formation involves the flying of the receiver aircraft 14 below and aft to the supplier aircraft 10. The transfer of ordnance is performed for the arming the receiver aircraft 14 in accordance with a pre-defined weapon configuration in order to enable the receiver aircraft 14, subsequent to the ordnance transfer procedure, to perform an air combat mission requiring the delivery of the received ordnance to designated targets. The arming procedure is accomplished by the utilization of a telescopic probe assembly 72 in combination with a mechanized arm assembly 73. The telescopic probe assembly 72 comprises a set of telescopic tubes where the innermost of those tubes is linked to a mechanized arm assembly 73. The base of the telescopic probe assembly 72 is secured rigidly to the supplier aircraft 10. When the ordnance transfer procedure is initiated and activated a transferable ordnance assembly is loaded into a specifically designed ordnance-carrier-cradle 19 that is connected rigidly to the mechanized arm assembly 73 which is connected rigidly in turn to the innermost telescopic tube of the retracted telescopic probe assembly 72. The cradle 19 is equipped with specific gripping arms that secure the transferable ordnance assembly firmly to the cradle 19. The ordnance assembly consists of a specific pylon adapter unit 18 and one or more ordnance units 20 attached rigidly and releasably to the pylon adapter unit 18. The manipulation of the telescopic probe assembly 72 is performed in a pre-defined manner in order to effect the establishment of a temporary mechanical link between the supplier aircraft 10 and the receiver aircraft 14. The telescopic tubes constituting the telescopic probe assembly 72 are suitably and gradually extended in order to affect the exit of the ordnance transfer assembly from the cargo bay of the supplier aircraft 10 through an existing or specifically designed and developed ordnance transfer opening 12. The telescopic probe assembly 72 and the associated mechanized arm assembly 73 are extended downward and aft towards the receiver aircraft 14. The mechanized arm assembly 73 is equipped with image acquiring devices, such as cameras, with lighting means, infrared means, and with foldable aerodynamic lifting and control surfaces 74 to provide the ordnance transfer assembly with appropriate monitoring capabilities, and with appropriate aerodynamic characteristics, respectively. At the distal end of the mechanized arm 73 the ordnance-carriage-cradle 19 is installed carrying the transferable ordnance assembly. The assembly includes one or more ordnance units 20 connected to a pylon adapter 18. The telescopic probe assembly 72 in association with the mechanized arm 73 is manipulated such as to enable the distal end of the mechanized arm carrying the ordnance-carriage cradle 19 to approach a designated weapon station on the lower surface of the receiver aircraft 14. When the ordnance assembly 19 suitably contacts a multi-purpose pylon 16 attached to the weapon station 17, the ordnance assembly 19 is firmly secured to the pylon 16. Consequently, the distal segment of the mechanized arm assembly 73 is disconnected from the transferable ordnance assembly. Subsequently, the movement of the ordnance transfer assembly is reversed. The telescopic probe assembly 72 is retracted gradually in order to be returned into the interior cargo bay of the supplier aircraft 10 with the mechanized arm assembly 73. At the completion of the ordnance transfer procedure the telescopic probe assembly 72 and the associated mechanized arm assembly 73 are stored in their entirety within the internal cargo bay of the supplier aircraft 10. In order to prepare the ordnance 20 for operations additional procedures such as the automatic stabilizing of the transferable ordnance assembly 19, the electrical or automatic or manual fusing of the ordnance 20, and the automatic, electrical or manual arming of the fuzes are performed. The ordnance transfer procedure could be repeated for the uploading of identical or different transferable ordnance assemblies to the other weapon stations of the receiver aircraft 14.

Figure 6:
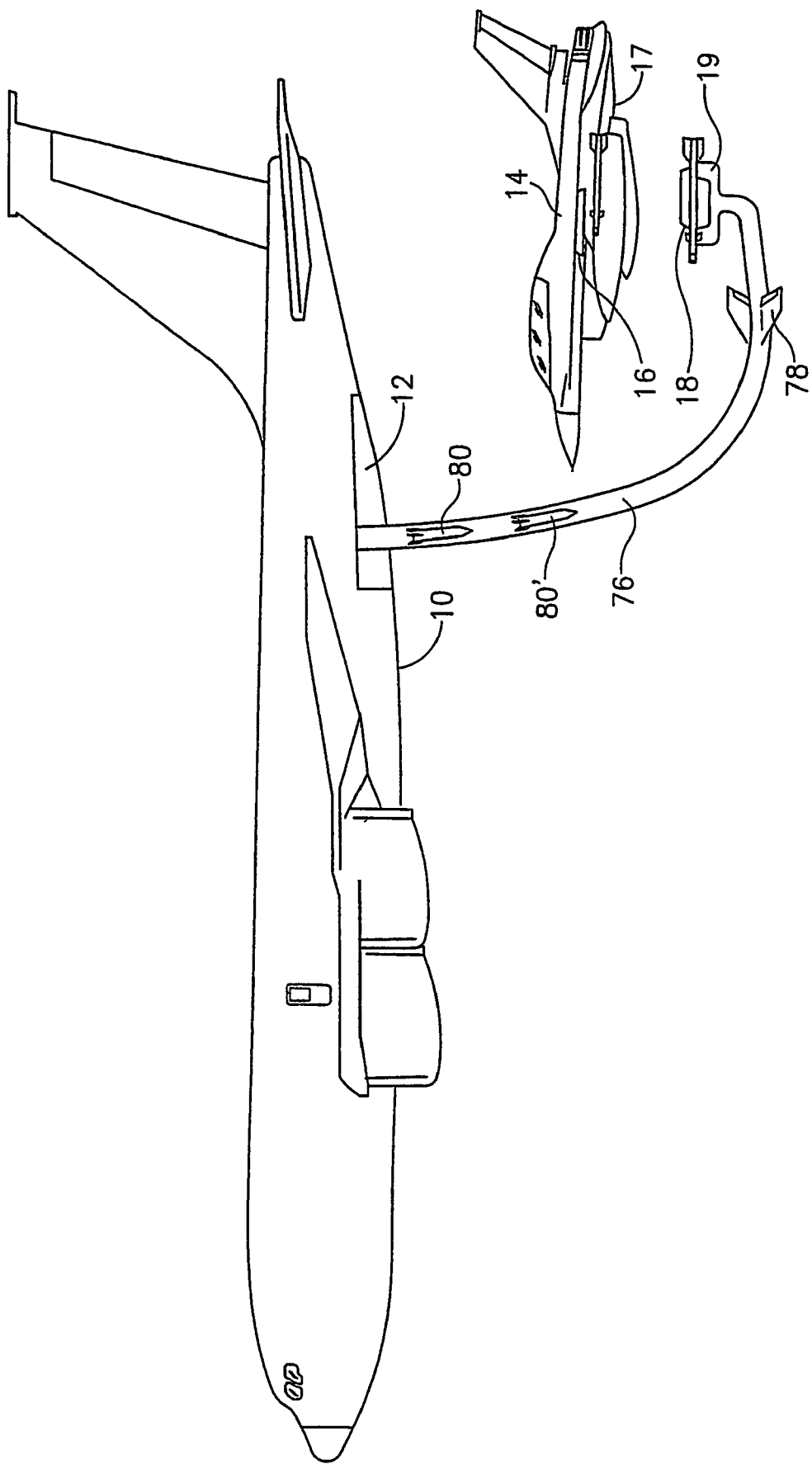
FIG. 6 is a schematic view showing a supplier (first) aircraft transferring ordnance to a receiver (second) aircraft, in accordance with the fourth preferred embodiment of the present invention.

Referring now to FIG. 6 that shows a supplier aircraft 10 and a receiver aircraft 14 during the performance of an air-to-air ordnance transfer procedure, in accordance with the fourth preferred embodiment of the invention. The supplier aircraft 10 and the receiver aircraft 14 are shown in-flight while maintaining a flight formation suitable for the airborne transfer of ordnance from the supplier 10 to the receiver 14. The formation involves the flying of the receiver 14 below and aft to the supplier 10. The transfer of ordnance is performed for the arming the receiver aircraft 14 in accordance with a pre-defined weapon configuration in order to enable the receiver 14, subsequent to the ordnance transfer procedure, to perform an air combat mission requiring the delivery of the received ordnance to designated targets. The arming procedure is accomplished by the utilization of a boom assembly 76. The boom assembly 76 comprises a conveyor mechanism enclosed in a rigid tube 76. The base of the boom assembly 76 is secured rigidly to the supplier aircraft 10. The boom assembly 76 is equipped with foldable aerodynamic lifting and control surfaces 78. At the distal end of the boom assembly 76 an ordnance-carriage-cradle 19 is installed. When the ordnance transfer procedure is initiated the boom assembly 76 is controllably extended from the supplier aircraft 10 and guided to the receiver aircraft 14 through suitable manipulation by a human controller. Consequent to the establishment of a temporary mechanical link between the supplier aircraft 10 and the receiver aircraft 14 via the boom assembly 76 an ordnance feeding process is initiated in the supplier aircraft. A set of required distinct ordnance units 80, 80' are continuously fed through the rigid tube by the ordnance conveyor mechanism to the ordnance-carriage-cradle 19. The cradle 19 is operative in the uploading of the ordnance to the suitable weapon station of the receiver aircraft 14. The boom assembly 76 is equipped with image acquiring devices, such as cameras, with lighting means, infrared means (not shown), and with foldable aerodynamic lifting and control surfaces 74 to provide the ordnance transfer process with appropriate monitoring capabilities, and with appropriate aerodynamic characteristics, respectively. Consequent to the completion of the ordnance transfer, the distal segment of the boom assembly 76 is disconnected from receiver aircraft 14. Subsequently, the movement of the boom assembly 76 is reversed. The boom assembly 76 is controllably retracted in order to be returned into the interior cargo bay of the supplier aircraft 10.

At the completion of the ordnance transfer procedure the boom assembly 76 is stored in its entirety within the interior of the supplier aircraft 10. In order to prepare the ordnance 18 for operations additional procedures, such the electrical or manual fusing of the ordnance 18, and the automatic or manual arming of the fuzes are performed.

Figure 7:
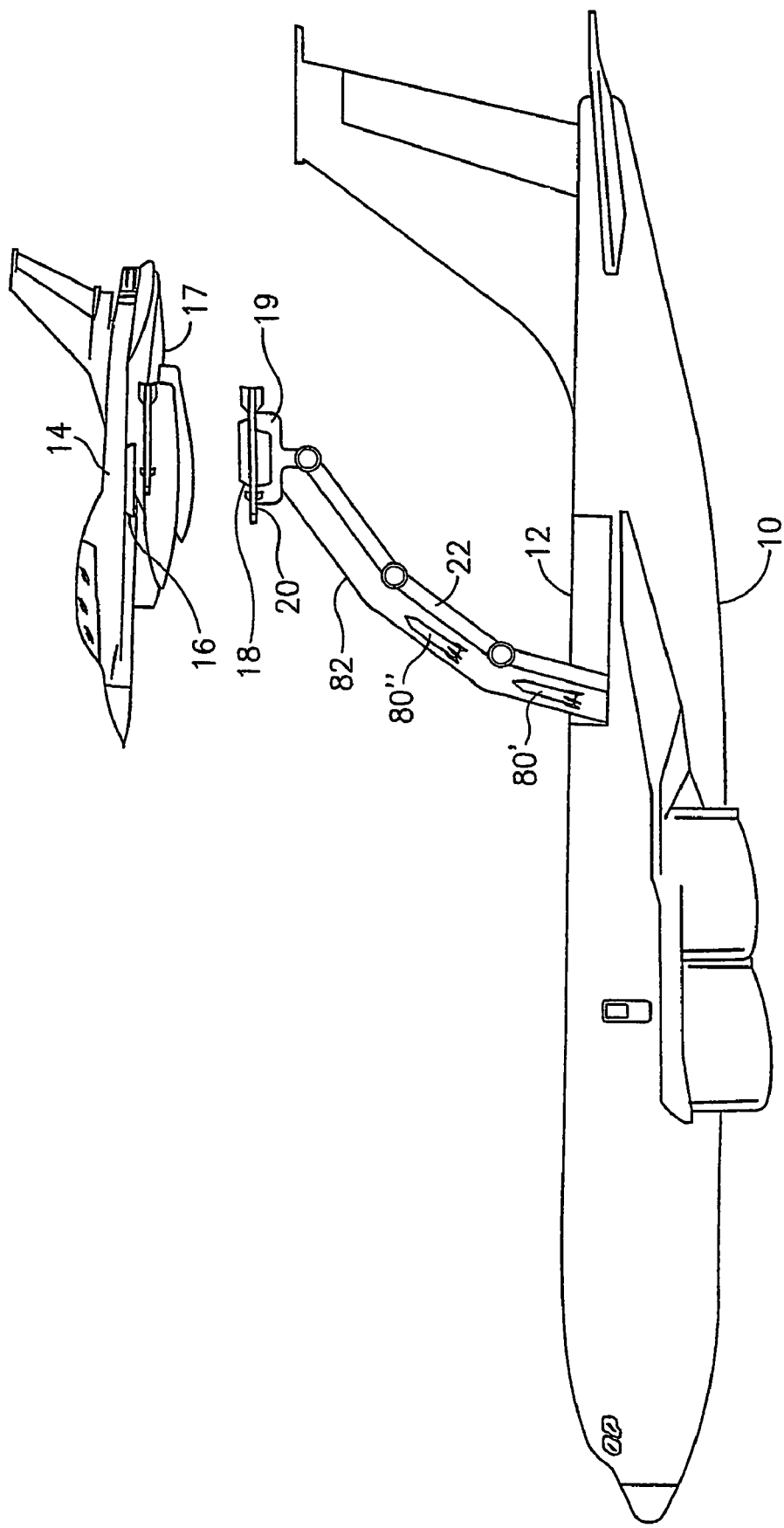
FIG. 7 is a schematic view showing a supplier (first) aircraft transferring ordnance to a receiver (second) aircraft, in accordance with the fifth preferred embodiment of the present invention.

Referring now to FIG. 7 that shows a supplier aircraft 10 and a receiver aircraft 14 during the performance of an air-to-air ordnance transfer procedure, in accordance with the fifth preferred embodiment of the invention. The supplier aircraft 10 and the receiver aircraft 14 are shown in-flight while maintaining a flight formation suitable for the airborne transfer of ordnance from the supplier aircraft 10 to the receiver aircraft 14. The formation involves the flying of the receiver aircraft 14 above and aft to the supplier aircraft 10 in order to expose the weapon stations typically located on the lower surface of the receiver aircraft 14 to the transfer monitoring means of the mechanized arm 22. The transfer of ordnance is performed for the arming the receiver aircraft 14 in accordance with a pre-defined weapon configuration in order to enable the receiver aircraft 14, subsequent to the ordnance transfer procedure, to perform an air combat mission requiring the delivery of the received ordnance to designated targets. The arming procedure is accomplished by the utilization of a sophisticated remotely operated mechanized arm assembly 22 in association with an externally mounted ordnance conveyor mechanism 82. The mechanized arm assembly 22 consists of a set of mechanized arm sections joined via flexible and motorized joints. The base of the mechanized arm assembly 22 is secured rigidly to the supplier aircraft 10. The other parts of the mechanized arm assembly 22 are free to move within pre-defined limits where the movement is accomplished by specific actuator units (assisted by aerodynamic lift provided by one or more aerodynamic control surfaces) installed on the various mechanized arm sections that are operative in the manipulation of the various joints connecting the different arms. Prior to the performance of the ordnance transfer procedure the mechanized arm assembly 22 with the associated externally mounted ordnance conveyor mechanism 82 is stored in the interior of the supplier aircraft 10 in a folded configuration providing for volumetrically efficient storage. When the ordnance transfer procedure is initiated and activated the suitable manipulation of the mechanized arm assembly 22 and the associated externally mounted ordnance conveyor mechanism 82 is performed in a pre-defined manner in order to establish a temporary mechanical link between the supplier aircraft 10 and the receiver aircraft 14. The subsequent manipulation of the mechanized arm assembly 22 and the associated externally mounted ordnance conveyor mechanism 82 is performed by ordnance transfer controllers within the supplier aircraft 10. Due to the operation of the ordnance transfer controllers the mechanized arm 22 gradually modifies its spatial configuration from the folded state to an unfolded state. During the unfolding of the mechanized arm assembly 22 the interlinked upper mechanized arms successively and controllably exit the body of the supplier aircraft 10 through a specifically designed ordnance transfer opening 12. Since the externally mounted ordnance conveyor mechanism 82 is suitably connected to the mechanized arm assembly 22 the movements of the externally mounted ordnance transfer mechanism 82 are in accordance with the movements of the mechanized arm assembly 22. The uppermost arm section of the mechanized arm assembly 22 is manipulated such as to approach a designated weapon station on the lower surface of the receiver aircraft 14. When the ordnance assembly 19 suitably contacts a multi-purpose pylon 16 attached to the weapon station 17, the ordnance assembly 19 is firmly secured to the designated weapon station of the receiving aircraft 14. Consequent to the creation of the mechanical link between the supplier aircraft 10 and the receiver aircraft 14 via the mechanized arm assembly 22 an ordnance feeding process is initiated in the supplier aircraft 10. A set of required distinct ordnance units 80, 80' are continuously fed through the externally mounted ordnance conveyor 82 to the ordnance-carriage-cradle 19. The cradle 19 is operative in the uploading of the ordnance to the suitable weapon station of the receiver aircraft 14. The mechanized arm assembly 22 is equipped with image acquiring devices, such as cameras, with lighting means, infrared means (not shown) to provide the ordnance transfer assembly with appropriate monitoring capabilities. Consequent to the completion of the ordnance transfer, the distal segment of the mechanized arm assembly 22 is disconnected from receiver aircraft 14. Subsequently, the movement of the mechanized arm assembly 22 is reversed. The assembly 22 is controllably retracted in order to be returned into the interior cargo bay of the supplier aircraft 10. At the completion of the ordnance transfer procedure the assembly 22 with the associated externally mounted ordnance conveyor mechanism are stored in entirety within the interior cargo bay of the supplier aircraft 10.

The movements of the mechanized arm assembly could be achieved via the aerodynamic lift provided by the aerodynamic control surfaces in combination with controlled power provided by power-generator device, such as hydraulic devices, servo-motors, electric motors, and the like.

Figure 8:
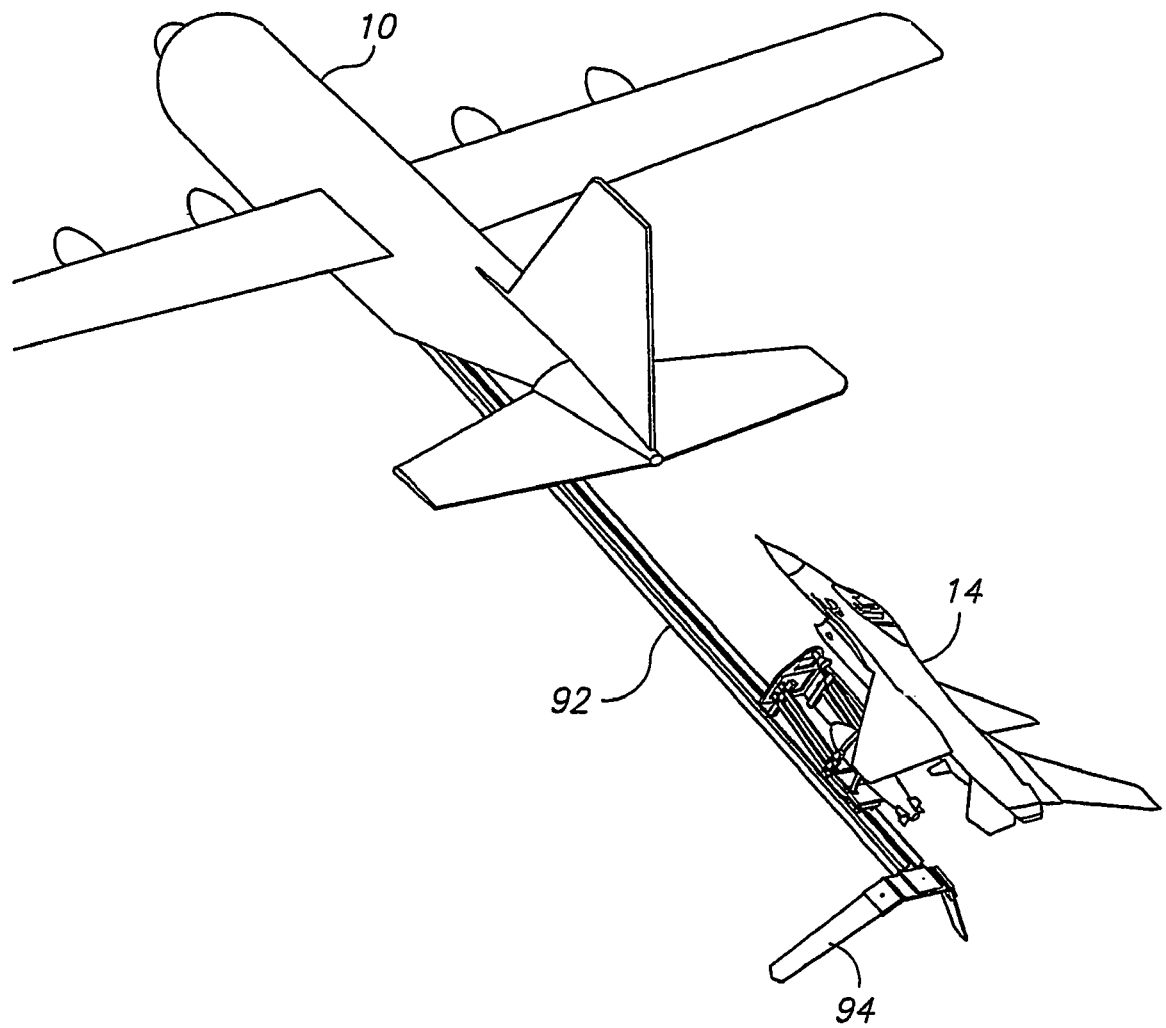
FIG. 8 is a schematic view showing a supplier (first) aircraft transferring ordnance to a receiver (second) aircraft, in accordance with the sixth preferred embodiments of the present invention.

Referring now to FIG. 8 that shows an exemplary supplier aircraft 10 and an exemplary receiver aircraft 14 during the performance of an air-to-air ordnance transfer procedure, in accordance with the sixth preferred embodiment of the invention. The supplier aircraft 10 and the receiver aircraft 14 are shown in-flight while maintaining a flight formation suitable for the airborne transfer of ordnance from the supplier aircraft 10 to the receiver aircraft 14. The formation involves the flying of the receiver aircraft 14 below and aft to the supplier aircraft 10. The transfer of ordnance is performed for the arming the receiver aircraft 14 in accordance with a pre-defined weapon configuration in order to enable the receiver aircraft 14, subsequent to the ordnance transfer procedure, to perform an air combat mission requiring the delivery of the received ordnance to designated targets. The arming procedure is accomplished by the utilization of a remotely operated extensible mechanized arm assembly 92 in association with an externally mounted ordnance conveyor mechanism (not shown). The mechanized arm assembly 92 consists of a set of arm sections such that the arm sections fit one into the other. Each arm section is joined via mechanical joints. The base of the mechanized arm assembly 92 is secured to the body of the interior cargo space of the supplier aircraft 10. The other parts the mechanized arm assembly 22 are free to move within pre-defined limits where the movement is accomplished by specific actuator units (assisted by aerodynamic lift provided by one or more aerodynamic control surfaces) installed on the distant arm section. The actuator units are operative in the extension and the retraction of the mechanized ordnance transfer assembly by sliding the arm sections in relation to each other in the desired direction. Prior to the performance of the ordnance transfer procedure the mechanized arm assembly 92 with the associated externally mounted ordnance conveyor mechanism (not shown) is stored in the interior of the supplier aircraft 10 in a folded configuration providing for volumetrically efficient storage. When the ordnance transfer procedure is initiated and activated the suitable manipulation of the mechanized arm assembly 92 and the associated externally mounted ordnance conveyor mechanism (not shown) is performed in a pre-defined manner in order to establish a temporary physical link between the supplier aircraft 10 and the receiver aircraft 14. The subsequent manipulation of the mechanized arm assembly 92 and the associated externally mounted ordnance conveyor mechanism (not shown) is performed by ordnance transfer controllers within the supplier aircraft 10 in association with a computerized transfer control, apparatus. Due to the operation of the ordnance transfer controllers and the computerized transfer control apparatus the mechanized arm 9 gradually modifies its spatial configuration from the collapsed state to an extended state. During the extension of the mechanized arm assembly 92 the inter-linked arm sections gradually, successively and controllably exit the body of the supplier aircraft 10 through a specifically designed ordnance transfer opening (not shown). Since the externally mounted ordnance conveyor mechanism (not shown) is suitably installed on the mechanized arm assembly 92 the movements of the externally mounted ordnance transfer mechanism are in accordance with the movements of the mechanized arm assembly 92. The mechanized arm assembly 92 is manipulated such as to approach a designated weapon station on the lower surface of the receiver aircraft 14. Consequently, an ordnance transfer cradle device loaded with a transferable ordnance unit is positioned on specifically designed movement direction bars installed on the upper surface of the mechanical arm and the cradle device is coupled to the ordnance conveyor mechanism. Utilizing the ordnance convey mechanism the cradle device loaded with the transferable ordnance unit is impelled to move to the distal arm section of the mechanized arm assembly 92. The arm 92 is suitably manipulated in order to accomplish physical contact between the ordnance transfer cradle and a pylon installed on the receiver aircraft 14. When the ordnance transfer cradle contacts the designated pylon (not shown) attached to a pre-determined weapon station (not shown) the mechanized area assembly 92 is firmly secured to the designated weapon station of the receiving aircraft 14. Consequent to the creation of the mechanical link between the supplier aircraft 10 and the receiver aircraft 14 via the mechanized arm assembly 22 an ordnance feeding process is initiated whereby the transferable ordnance unit is attached to the pylon, the cradle is disconnected from the ordnance unit, and the empty ordnance transfer cradle device is returned to the supplier aircraft 10 along the mechanical arm assembly 92 through the activation of the ordnance conveyor mechanism in the reversed direction. Thus, a set of required distinct ordnance units could be continuously transferred from the supplier aircraft 10 to the receiver aircraft 14 through the mechanized arm assembly 92 where the transfer is accomplished by the bi-directional movement of the ordnance-carriage-cradle accomplished via the operation of the ordnance conveyor mechanism. The mechanized arm assembly 92 is equipped with image acquiring devices, such as cameras, with lighting means, infrared means (not shown) to provide for appropriate monitoring capabilities. Consequent to the completion of the entire ordnance transfer, the movement of the mechanized arm assembly 92 is reversed. The assembly 92 is controllably retracted in order to be returned into the interior cargo bay of the supplier aircraft 10. At the completion of the ordnance transfer procedure the assembly 92 with the associated externally mounted ordnance conveyor mechanism are stored in entirety in a folded (collapsed) within the interior cargo bay of the supplier aircraft 10. The movements of the mechanized arm assembly are achieved via the aerodynamic lift provided by the aerodynamic control surfaces 94 installed on the distal arm section of the mechanized arm 92 in combination with controlled power provided by power-generator means, such as hydraulic devices, servo-motors, electric motors, and the like.

Figure 9:
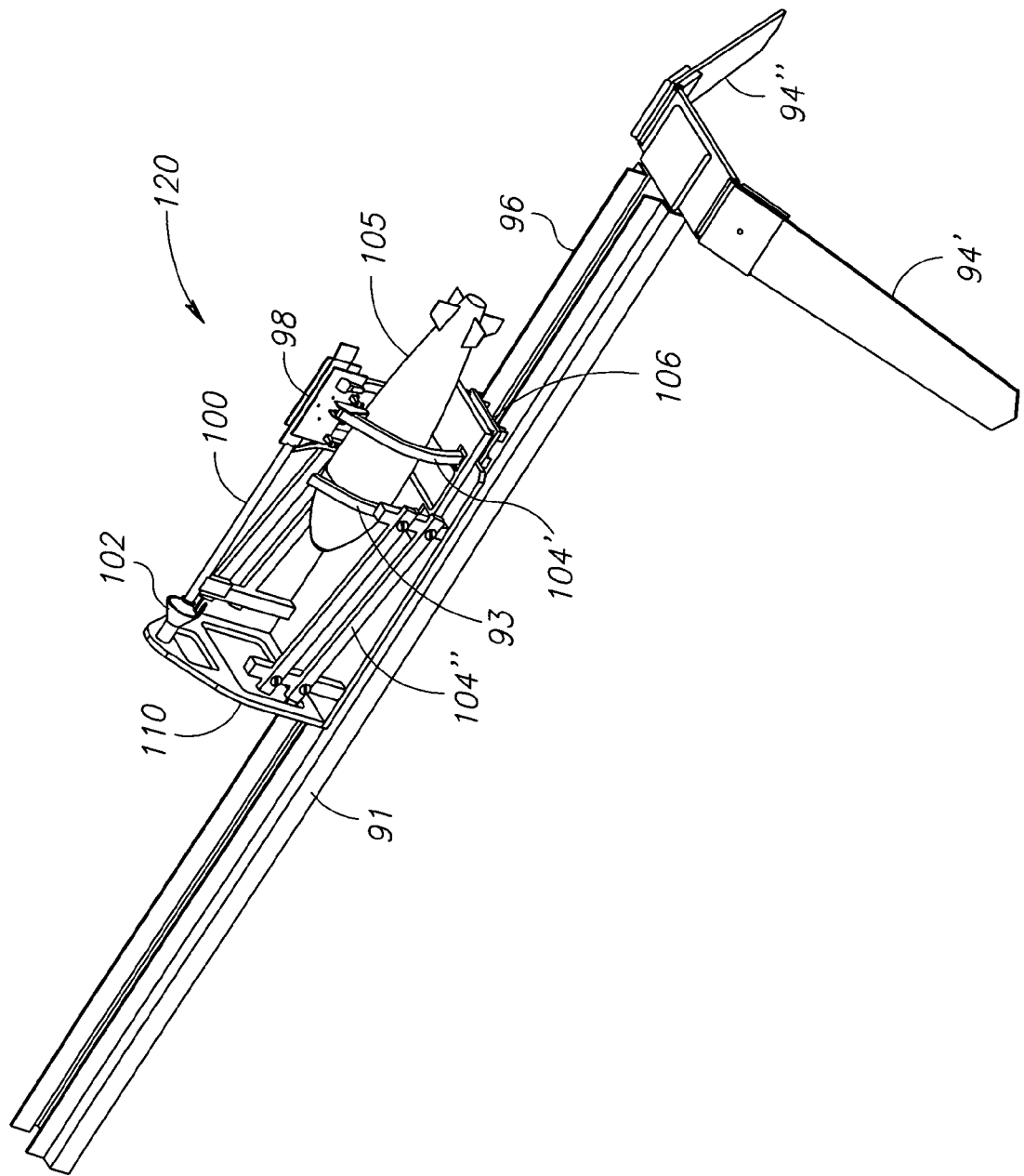
FIG. 9 shows the distal (second) end of the ordnance transfer assembly with the moveable ordnance cradle carrying the transferable ordnance, in accordance with the sixth preferred embodiment of the present invention.

Referring now to FIG. 9 that shows a more detailed view of the distal arm section 91 that is semi-rigidly attached to the mechanized arm assembly. The arm section 91 includes collapsible aerodynamic control surfaces 94' and 94" to provide for aerodynamic lift and control. The surfaces 94' and 94" are automatically unfolded following the exit of the arm section 91 from the supplier aircraft. The surfaces 94' and 94" are folded during the retraction of the mechanical arm assembly prior to the retraction of the distal arm section 91 into the interior of the supplier aircraft. The arm section 91 further includes movement guidance bars 96. The bars 96 provide guidance to the ordnance-carriage-cradle 110 which is positioned on the bars 96. The ordnance-carriage-cradle 110 is coupled to an ordnance conveyor mechanism (not shown) associated with the mechanical arm assembly. The cradle 110 includes a cradle body 106, a set of ordnance unit positioning bars 93, a set of ordnance unit gripping arms 104', 104", and a guidance boom 102. The ordnance unit 105 is positioned on the ordnance body 106 and secured firmly to the body 105 by the ordnance unit gripping arms 104', 104". The guidance boom 102 is a hollow, hemispherical device rigidly attached to the cradle body 106. The open side of the boom 102 faces towards the pylon 98 that is installed on the receiver aircraft. When during the final phase of the approach of the mechanical arm to the receiver aircraft the arm section 91 approaches the pylon 98 the boom device 102 creates tentative contact with an elongated engagement rod 100 installed on the pylon 98. Prior to the transfer operation the engagement rod 100 is stored in a retracted position within a pre-designed cavity (not shown) in the body of the pylon 98. In order to prepare for the reception of the ordnance unit the engagement rod 100 exits the storage cavity thereof. Consequently the rod 100 is able to engage the approaching boom device 102. Since the boom 102 is rigidly mounted on the ordnance-carriage-cradle 110 and the cradle 110 is rigidly connected to the arm section 91 the movement of the ordnance transfer assembly 120 is precisely guided to an optimal position in relation to the pylon 98. When the ordnance unit 105 is in the optimal position for the purpose of uploading on the pylon 98 the ordnance positioning arms 93 are manipulated mechanically to effect the precise attachment of the ordnance unit 105 to the pylon 98. Consequently, the gripping arms 104', 104" are opened outward in order to provide for the disconnection of the cradle 110 from the ordnance unit 105. The arm section 91 that is attached semi-rigidly to the mechanized arm is retracted and the empty ordnance-carriage-cradle 106 is impelled to move in the reverse direction (toward the supplier aircraft) guided by the guidance bars 96 where the movement is provided by the ordnance conveyor mechanism. The boom 102 looses contact with the elongated guidance bar 100. The uploading of the ordnance unit 105 to the pylon 98 is completed via a set of automated procedures such as stabilizing, optional fuzing, and the like. While the mechanical arm assembly remains extended with the distal arm section 91 in the vicinity of the receiver aircraft the ordnance-carriage-cradle 110 is driven back into the interior cargo space of the supplier aircraft along the mechanical arm assembly for the purpose of re-loading of the cradle 110 with additional transferable ordnance units. Following the completion of the transfer and the loading of the ordnance unit to the pylon 98 the engagement rod 100 is automatically retracted into the pre-designed cavity in the body of the pylon 98 in order to improve the aerodynamic characteristics of the pylon 98.

Diverse fuzing devices activate bomb or other ordnance units. Mechanical fuzing devices are armed via the operation of standard arming cables. The arming cables are connected at one end to the mechanical fuze and connected to an arming-cable lock device (installed on a pylon) at the other end. In the preferred embodiments of the invention, when bomb units pre-fuzed with mechanical fuzes are transferred from the supplier aircraft to the receiver aircraft, the bombs are transferred along with pre-prepared arming cables. One end of an arming cable is connected to the pre-installed fuze while the other end of the arming cable is connected to an engagement loop (not shown) installed on the ordnance-carriage-cradle. During the uploading of a bomb unit, pre-fuzed with a mechanical fuze and with an associated pre-prepared arming cable, the other end of the arming cable is automatically engaged with the proper arming-cable lock installed in the pylon. Consequent to the ejection of the bomb unit during subsequent operations the locked end of the associated arming cable may remain connected to the pylon. Therefore, prior to the repeated air-to-air re-arming of the pylon with another bomb unit the previously "used" arming cables should be extracted from the arming-cable lock of the pylon. In order to free the lock from the previous cable and prepare it for the insertion of a new cable the ordnance-carriage-cradle is equipped with an arming cable extraction and collection mechanism (not shown). The mechanism is designed to extract the arming cable from the arming-cable lock and to store the extracted arming cable into a specifically designed "used" arming-cable container unit (not shown) that is installed on the ordnance-carriage-cable. Note should be taken that the trends in the fuzing systems and methods developments clearly indicate increased sophistication and automation. Thus, the utilization of future fuzing systems and methods could substantially simplify the air-air arming apparatus and method proposed by the present invention.

The different ordnance transfer assemblies described herein above in association with the different embodiments of the invention may be required to handle different types of ordnance having different mass and different aerodynamic characteristics. In order to provide for efficient, secure, and safe transfer of the ordnance, the movements of the transfer assemblies will be suitably optimized in accordance with pre-defined type-specific values provided to a computer control program. In accordance with the type-specific values the automatic commands sent to the transfer assemblies will be modified appropriately by the control program and the manual commands of the ordnance transfer operator will be appropriately adjusted by the same control program.

There are specific pre-defined parameters associated with the type of ordnance, the type of receiver aircraft, the type of the ordnance transfer assembly, and the like, that could define independently or in combination the limits of expediency of a specific ordnance transfer process. Such parameters could include ordnance weight, aerodynamic lift, manipulative efficiency of the transfer assembly, fuzing options for the ordnance type, transfer performance safety, transfer assembly carriage limits, mechanical interface options, and the like.

The spatial locations, mechanical and aerodynamic characteristics of the receiving weapon stations should be taken in consideration. For example, the weapon station should be located and constructed such as to provide sufficient maneuvering space surrounding the associated pylon in order to provide for safe connection with for the distal end of the transfer assembly. Furthermore, note should be taken that the spatial relationships of the weapon station/pylon and edge-carriage-cradle of the transfer assembly at the critical stages of the connection must not generate unacceptable aerodynamic conditions.

The advantages inherent in the apparatus and method proposed by the present invention were amply demonstrated by the foregoing description of the five preferred embodiments. It would be easily perceived by one with ordinary skill in the art that all the embodiments are exemplary only. The apparatus, apparatus and method of performing an air-to-air arming of an aerial vehicle allows for a plurality of alternative internal and external formations, options, versions, configurations, arrangements, procedures, operations, and applications. For example, the ordnance transfer assembly could comprise a suitably extendable cable equipped with aerodynamic control surfaces and connected at the distal end to a drogue device. Another example for a possible modification concerns an aerial arming of two or more receiver aircraft that could be performed substantially simultaneously. In another example, a simultaneous arming and fuelling of one or more aerial vehicles could be performed from a single supplier aircraft. Yet in another example, a peer-to-peer mode of aerial arming could be accomplished where the supplier aircraft could be of a type similar to the receiver aircraft. In such a case the ordnance transfer apparatus could be substantially simplified, miniaturized and fully automated, the type and the quantities of the transferable ordnance could be limited. Still in another example, the proposed apparatus, apparatus and method could provide for the air-to-air transfer of expandable electronic/thermal counter-measures, leaflets, air-launched micro aerial vehicles, air-launched micro satellites, droppable intelligence devices, replacement pods, fuel tanks, droppable supplies for ground forces, and the like. The foregoing descriptions were provided only for enabling a ready understanding of the concepts underlying the present invention and should not be interpreted in as limiting. Therefore, it will be appreciated by persons with ordinary skills in the art that the present invention is not limited to what has been particularly shown and described hereinabove. The scope of the present invention is defined only by the claims, which follow.

I claim:

1. An apparatus for air-to-air transfer of at least one ordnance unit from a first airborne aerial vehicle to a second airborne aerial vehicle, the apparatus comprising:
   pylon installed on the second airborne aerial vehicle and intended to receive the at least one ordnance unit transferred from the first airborne aerial vehicle to the second airborne aerial vehicle;
   an ordnance transfer assembly providing for the carriage of the at least one ordnance unit on a rigid surface from the first airborne aerial vehicle to the second airborne aerial vehicle; and
   an ordnance carriage cradle connected to the ordnance transfer assembly for storing the at least one ordnance unit;
   a pylon adapter to verify the connection of the at least one ordnance unit to the pylon installed on the second airborne aerial vehicle, the pylon adapter comprising a mechanical connector to the pylon;
a power generator device to provide power for the movement of the ordnance transfer assembly.

2. The apparatus according to claim 1, further comprises an extendible arm assembly attached to the first airborne aerial vehicle, the arm first end is attached to the body of the first airborne aerial vehicle, the arm second end provided with freedom of movement.

3. The apparatus of claim 2 further comprising an ordnance transfer control assembly providing for the control of the arm and the ordnance transfer assembly to enable controlling the movement of the extended arm in a bi-directional, multi-axis movement.

4. The apparatus of claim 1, wherein the ordnance carriage cradle is mounted outside the ordnance transfer assembly, hence the at least one ordnance unit held by said ordnance carriage cradle is not limited in size by the size of the ordnance transfer assembly.

5. The apparatus of claim 1 wherein the at least one ordnance unit is an aerial bomb device intended to be released, dropped or ejected from the second aerial vehicle toward a target.

6. The apparatus of claim 1 wherein the at least one ordnance unit is a missile device to be launched from the second aerial vehicle toward a target.

7. The apparatus of claim 3 wherein the ordnance transfer control assembly comprises:
   a computer device having a memory device to hold software programs associated with the control of the movement of the extendible arm;
   a communication device to transfer bi-direction control data, command data and positional information between the first aerial vehicle and the extendible arm;
   thereby enabling control for an air-to-air transfer of the at least one ordnance unit from the first aerial vehicle to the second aerial vehicle.

8. The apparatus of claim 1 wherein the ordnance transfer assembly further comprises a foldable aerodynamic control surface assembly to provide for aerodynamic lift and control to the extendible arm.

9. The apparatus of claim 3 wherein the ordnance transfer assembly further comprises an at least one image acquiring device to provide the arm position-specific images to the ordnance transfer control assembly.

10. The apparatus of claim 9 further comprising an at least one lighting device to enhance the quality of the arm position-specific images provided to the ordnance transfer control assembly during ordnance transfer occurring under reduced quality lighting conditions.

11. The apparatus of claim 9 further comprising an at least one night vision device to provide enhanced quality mechanical arm position-specific images during day and nighttime ordnance transfer.

12. The apparatus of claim 1 wherein the extendible arm assembly further comprises:
   bi-directional movement providing means to drive the arm assembly from or to the first aerial vehicle; and
   multi-axis movement providing means to control the arm assembly unit along several axes;
   thereby enabling bi-directional and multi axis movement and control of the extendible arm within a trajectory between the first airborne aerial vehicle and the second airborne aerial vehicle.

13. The apparatus of claim 2 wherein the ordnance transfer assembly comprises at least two interlinked arm sections coupled together by at least one motorized joint to provide for the movement of the interlinked arm sections in respect to each other.

14. The apparatus of claim 1 wherein the ordnance transfer assembly comprises:
   at least two ordnance gripping arms;
   at least one stabilizing surface to be used for stabilizing the pylon adapter to the pylon; and
   a multi-fuzing unit to enable fuzing of the at least one transferred ordnance unit.

15. The apparatus of claim 1 wherein the ordnance transfer assembly is an extendible telescopic probe assembly comprising at least two telescopic tubes with the base of the ordnance transfer assembly attached to the first aerial vehicle and the innermost telescopic tube is linked to the second aerial vehicle.

16. The apparatus of claim 15 wherein the ordnance transfer assembly comprises at least two interlinked mechanized arm sections joined by motorized links and providing movement of the mechanized arm sections in respect of each other.

17. The apparatus of claim 13 wherein the ordnance transfer assembly comprises a ordnance transfer assembly connected to the second end of the arm assembly, the ordnance transfer assembly comprising an ordnance carrier cradle equipped with gripping arms to secure at least one ordnance unit to the ordnance carriage cradle.

18. The apparatus of claim 1 wherein the extendible arm is an extendible boom assembly attached at one end to the first airborne aerial vehicle, the boom assembly comprising:
   an internally mounted ordnance conveyor mechanism enclosed in a rigid or semi-rigid tube for the feeding of the at least one ordnance unit from the first airborne aerial vehicle to the second airborne aerial vehicle;
   at least one foldable aerodynamic lifting and control surface to provide for the controlling of the boom assembly; and
   an ordnance carriage cradle installed at the second end of the boom assembly.

19. The apparatus of claim 1 wherein the extendible arm comprises at least two interlinked arm sections having at least one motorized joints to provide for the movement of the interlinked arm sections in respect to each other, the arm comprising:
- an externally mounted ordnance conveyor mechanism enclosed in a rigid or semi-rigid tube connected to the at least two interlinked mechanized arm section to provide for the feeding of an at least one ordnance unit from the first airborne aerial vehicle to the second airborne aerial vehicle;
- an at least one aerodynamic lifting and control surface to control maneuvering of the extended arm; and
- an ordnance carriage cradle installed at the second end of the arm to receive an at least one ordnance unit fed by the ordnance conveyor mechanism and attach the at least one ordnance unit to a pylon attached to a weapon station on the second airborne aerial vehicle.

20. The apparatus of claim 1 wherein the extendible arm comprises an at least two arm sections joined by at least one mechanical joint to provide for the slideable movement of the at least two arm sections in respect to each other, the extendible arm comprising;
- a first arm section attached to the body of interior cargo space of the first airborne aerial vehicle via a flexible base unit that provides freedom of multi-axis movement;
- one or more intermediate arm sections to connect the first arm section to a second arm section;
- a second arm section comprising a foldable aerodynamic control surface assembly to provide for the lift for the ordnance and aerodynamic control of the arm during movement of the arm between the first airborne aerial vehicle and the second airborne aerial vehicle;
- at least one actuator unit to provide for slideable movement of the arm sections in respect to each other:
- an externally mounted ordnance conveyor mechanism to provide for the transfer of the at least one ordnance unit from the first airborne aerial vehicle to the second airborne aerial vehicle, the ordnance conveyor mechanism comprising:
  - a moveable ordnance carriage cradle device to carry the at least one ordnance unit along the extended mechanical arm from the first arm section of the mechanical arm via the intermediate arm sections of the mechanical arm to the second arm section of the mechanical arm in order to transfer the at least one ordnance unit between the first airborne aerial vehicle and the second airborne aerial vehicle; and
  - at least two movement direction bars extended along, the mechanized arm sections in order to provide support and direction to the moveable ordnance carriage cradle device; and
  - a power generator to provide power for the movement of the ordnance carriage cradle device along the at least two interlinked arm sections of the arm.

21. The apparatus of claim 20 wherein the moveable ordnance carriage cradle device coupled to the ordnance conveyor mechanism associated with the arm, the ordnance carriage cradle device comprising:
- a cradle body to support operational elements of the ordnance carriage cradle device;
- at least two ordnance unit positioning bars to provide upward movement to the at least one ordnance unit where the ordnance unit is positioned in relation to the pylon;
- at least two ordnance unit gripping arms to hold the at least one ordnance unit on the ordnance carriage cradle during the transfer of the at least one ordnance unit between the first airborne aerial vehicle and the second airborne aerial vehicle; and
- a guidance boom device attached to the cradle body to provide in the final phase of the ordnance transfer the establishment of contact with an engagement rod installed on the pylon.

22. The apparatus of claim 1 wherein the first airborne aerial vehicle is a manned cargo aircraft.

23. The apparatus of claim 22 wherein the first airborne aerial vehicle is a Lockheed Martin C-130 Hercules.

24. The apparatus of claim 1 wherein the first airborne aerial vehicle is an unmanned or an uninhabited aircraft.

25. The apparatus of claim 1 wherein the second airborne aerial vehicle is a manned aircraft.

26. The apparatus of claim 1 wherein the second airborne aerial vehicle is an unmanned or uninhabited aerial vehicle.

27. The apparatus of claim 1 wherein the first aerial vehicle and the second aerial vehicle are space platforms.

28. A method for air-to-air transfer of at least one ordnance unit from a first airborne aerial vehicle to a second airborne aerial vehicle, the method comprising:
- loading the at least one ordnance unit into an ordnance storage rack installed within an internal cargo space of the first airborne aerial vehicle;
- transferring the at least one ordnance unit from the ordnance storage rack installed within the cargo space of the first airborne aerial vehicle into an ordnance carriage cradle associated with an ordnance transfer assembly secured at a first end to the first airborne aerial vehicle while a second end is provided with a freedom of movement to enable bi-directional movement of the second end between the first airborne aerial vehicle and the second airborne aerial vehicle,
- the ordnance carriage cradle comprising
  - a pylon adapter to verify connection of the at least one ordnance unit during an air-to-air ordnance transfer, the pylon adapter comprising:
  - a mechanical connector to the pylon;
- manipulating the extendible arm to provide for the bi-directional, movement of the arm between the first airborne aerial vehicle and the second airborne aerial vehicle.

29. The method of claim 28 further comprising:
- establishing contact between the at least one ordnance unit or the at least one ordnance assembly and the second airborne aerial vehicle; and
- attaching the at least one ordnance unit or the at least one ordnance assembly to a pylon of the second airborne aerial vehicle.

30. The method of claim 28 further comprising establishing contact between the second end of the arm and the second airborne aerial vehicle via the manipulation of the arm.

31. The method of claim 28 further comprising uploading the ordnance unit on an external or internal weapon station on the second airborne aerial vehicle.

32. The method of claim 28 further comprises:
- disconnecting the second end of the arm from the at least one ordnance unit or from the at least one ordnance assembly;
- stabilizing the at least one ordnance unit or the at least one ordnance assembly to a pylon; and
- fuzing the at least one ordnance unit or the at least one ordnance unit attached to the at least one ordnance assembly.

33. The method of claim 28 further comprises retracting the manipulable, extendible arm at the completion of the ordnance transfer procedure into the internal cargo space of the first airborne aerial vehicle.

34. The method of claim 28 further comprises feeding the at least one ordnance unit via an internally installed conveyor mechanism associated with the arm from the first airborne aerial vehicle to the second airborne aerial vehicle.

35. The method of claim 28 further comprises feeding the at last one ordnance unit via an externally installed ordnance conveyor mechanism associated with the extendible, manipulable arm from the first airborne aerial vehicle to the second airborne aerial vehicle.

36. The method of claim 28 further comprises controllably moving the ordnance carriage cradle carrying the at least one ordnance unit or the at least one ordnance assembly from the first airborne aerial vehicle to the second airborne aerial vehicle along the extended arm assembly where the second end of the arm assembly.

37. The method of claim 28 further comprises a step of aborting the ordnance transfer comprises a retrieval of the extendible arm.

38. The method of claim 37 wherein the step of aborting the ordnance transfer comprises jettisoning of the arm or the ordnance, or the ordnance carriage cradle or at least one part of the arm.

* * * * *